(12) United States Patent
Kelderman et al.

(10) Patent No.: US 11,102,933 B1
(45) Date of Patent: Aug. 31, 2021

(54) SYSTEMS AND METHODS FOR CONTROLLING A CONFIGURATION OF A BALE CHUTE OF A BALER

(71) Applicant: DEERE & COMPANY, Moline, IL (US)

(72) Inventors: Hunter T. Kelderman, Ottumwa, IA (US); Timothy J. Kraus, Blakesburg, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 16/861,889

(22) Filed: Apr. 29, 2020

(51) Int. Cl.
*A01F 15/08* (2006.01)
*B65G 11/12* (2006.01)

(52) U.S. Cl.
CPC .......... *A01F 15/0875* (2013.01); *B65G 11/12* (2013.01)

(58) Field of Classification Search
CPC ..... B65G 11/12; B65G 11/26; A01F 15/0875; A01F 15/08; A01F 2015/074
USPC .................................................... 193/2 R, 15
See application file for complete search history.

(56) References Cited

U.S. PATENT DOCUMENTS

| | | | | |
|---|---|---|---|---|
| 3,612,364 A | * | 10/1971 | Goucher | B65D 90/623 222/427 |
| 3,820,453 A | * | 6/1974 | Tipton | A01F 15/0875 100/188 R |
| 6,134,870 A | * | 10/2000 | Lippens | A01F 15/0875 100/8 |
| 9,572,299 B2 | * | 2/2017 | Vanhoutte | A01F 15/14 |
| 2012/0240795 A1 | * | 9/2012 | Tacke | A01F 15/0875 100/35 |
| 2015/0020699 A1 | * | 1/2015 | Vanhercke | A01F 15/0825 100/4 |
| 2016/0150734 A1 | * | 6/2016 | Vanhoutte | A01F 15/14 56/343 |

FOREIGN PATENT DOCUMENTS

EP 1935232 * 6/2008 ............. A01F 15/08

* cited by examiner

*Primary Examiner* — James R Bidwell

(57) ABSTRACT

Systems and methods for controlling a configuration of a bale chute of a baler and, particularly, a square baler are disclosed. In some implementations, the baler includes a linkage and an actuator that is operable to move the bale chute between an extended position and a retracted position and to lock the bale chute in the retracted position. For example, the bale chute may be retracted into a retracted position when the baler is determined not to be producing bales, when a bale is not protruding from the baler, and when the baler is being transported.

11 Claims, 24 Drawing Sheets

SYSTEMS AND METHODS FOR CONTROLLING A CONFIGURATION OF A BALE CHUTE OF A BALER

FIELD OF THE DISCLOSURE

The present disclosure relates generally to agricultural balers and, more particularly, to systems and methods for controlling agricultural balers operable to produce square bales.

BACKGROUND OF THE DISCLOSURE

Agricultural balers may be used to gather, compress, and shape crop material into bales, thereby producing crop bales. One such baler, which is sometimes referred to as a square baler, may be used to produce bales having a cube or cuboid shape, which may be referred to as square- or rectangular-shaped bales. Cube or cuboid-shaped bales are collectively referred to hereinafter as "square bales." Square balers may utilize a plunger that moves within a baling chamber to compress the crop material into a square bale. Generally, the plunger moves reciprocally within the baling chamber to form the square bale.

SUMMARY OF THE DISCLOSURE

A first aspect of the present disclosure is directed to a baler operable to form bales. The baler may include a housing, a bale chute pivotably connected to housing at the second end, and an actuator operable to extend and retract the bale chute into an extended position and a retracted position, respectively. The actuator may be operable to lock the chute into the retracted position upon actuation of the actuator in a first direction. The housing may include a first end, a second end, and a baling chamber.

A second aspect of the present disclosure is directed to a method for controlling at least one of an extension and a retraction of a bale chute of a baler. The method may include determining whether a bale chute is in an extended position or a retracted position; determining whether the baler is operating to produce bales; if the baler is determined to be in the extended position and if the baler is determined to be operating to produce bales, maintaining the bale chute in the extended position; if the baler is determined to be in the extended position and if the baler is determined not to be producing bales, determining if the baler is being transported; if the baler is determined not to be being transported, maintaining the bale chute in the extended position; if the baler is determined to be being transported, determining whether a bale is protruding from baler; if a bale is determined to be protruding from the baler, preventing retraction of the bale chute; and if a bale is determined not to be protruding from the baler, retracting the bale chute into the retracted position.

The various aspects of the present disclosure may include one or more of the following features. The actuator may include a moveable rod. Extension of the moveable rod may operate to lock the bale chute into the retracted position. The bale chute may be operably coupled to the actuator by a linkage assembly. The linkage may include a first set of links pivotably coupled to the bale chute and a second set of links pivotably coupled to the first set of links and pivotably coupled to the housing. The first set of links may include first link ends defining receptacles. The second set of links may include a first set of aligned elongated slots and a second set of aligned elongated slots offset from the first set of aligned elongated slots. The linkage assembly may also include a first pin received into the second set of elongated slots and slideable therein and a second pin received into the first set of elongated slots and slideable therein. The second pin may be configured to be removably received into the receptacles. The first pin and the second pin may be coupled to and biased away from each other by a biasing component such that movement of one of the first pin and the second pin towards the other of the first pin and the second pin increases a biasing force that operates to repel the first pin from the second pin. The actuator may include a moveable rod. The moveable rod may be pivotably coupled to the second pin. Extension of the moveable rod in the first direction may cause the first set of links to rotate relative to the second set of links such that the link ends engage the second link, displacing the second pin towards the first pin until the receptacles align with the second pin at which point the biasing force urges the second pin into engagement with the receptables and locking the bale chute into the retracted position. Rotation of the first set of links relative to the second set of links may include increasing an angle formed the first set of links and the second set of links. Retraction of the moveable rod in a second direction, opposite the first direction, may withdraw the second link from the receptacles and may decrease an angle formed between the first set of links and the second set of links to move the bale chute into the extended position. The bale chute may include brackets forming a third set of elongated slots, a third pin may be received into the third set of elongated slots and may couple the second ends of the first set of links to the brackets of the bale chute. The third set of elongated slots may be U-shaped. The third pin may be movable within the third elongated slots and relative to the brackets in response to pivoting movement of the bale chute towards the second end of the housing. A first rod and a second rod may extend between the first pin and the second pin. The biasing component may include a first spring and a second spring. The first spring may be received onto the first rod, and the second spring may be received onto the second rod. The first spring and the second spring may be located between the first pin and the second pin, and the first rod and the second rod may capture the first pin and the second pin and define a maximum distance permitted to be formed between the first pin and the second pin.

The various aspects may also include one or more of the following features. Retracting the bale chute into the retracted position if a bale is determined not to be protruding may include providing an indication to an operator to verify retraction of the bale chute prior to retracting the bale chute to the retracted position. Whether a bale ejection system is being operated may be detected when the baler is determined not to be being transported and the bale chute is determined to be in the extended position, and the bale chute may be maintained in the extended position if the bale ejection system is being operated. If a bale is protruding from the baler may be determined if the bale ejection system is not being operated, and the bale chute may be retracted if a bale is determined not to be protruding from the baler. The bale chute may be extended into the extended position if the bale chute is determined to be in the retracted position and if the baler is determined to be operating to produce bales. Operation of a bale ejection system may be prevented if the bale chute is determined to be in the retracted position and if the baler is determined not to be operating to produce bales. Operation of the bale ejection system may be prevented if the bale ejection system is determined to be operating. Determining if the baler is being transported may include utilizing GPS information to determine whether the baler is being transported. Utilizing GPS information to determine whether the baler is being transported may include utilizing GPS position information and map information containing roadway information and determining whether a GPS position of the baler is located along a roadway to verify the baler is being transported.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

Figure 1:
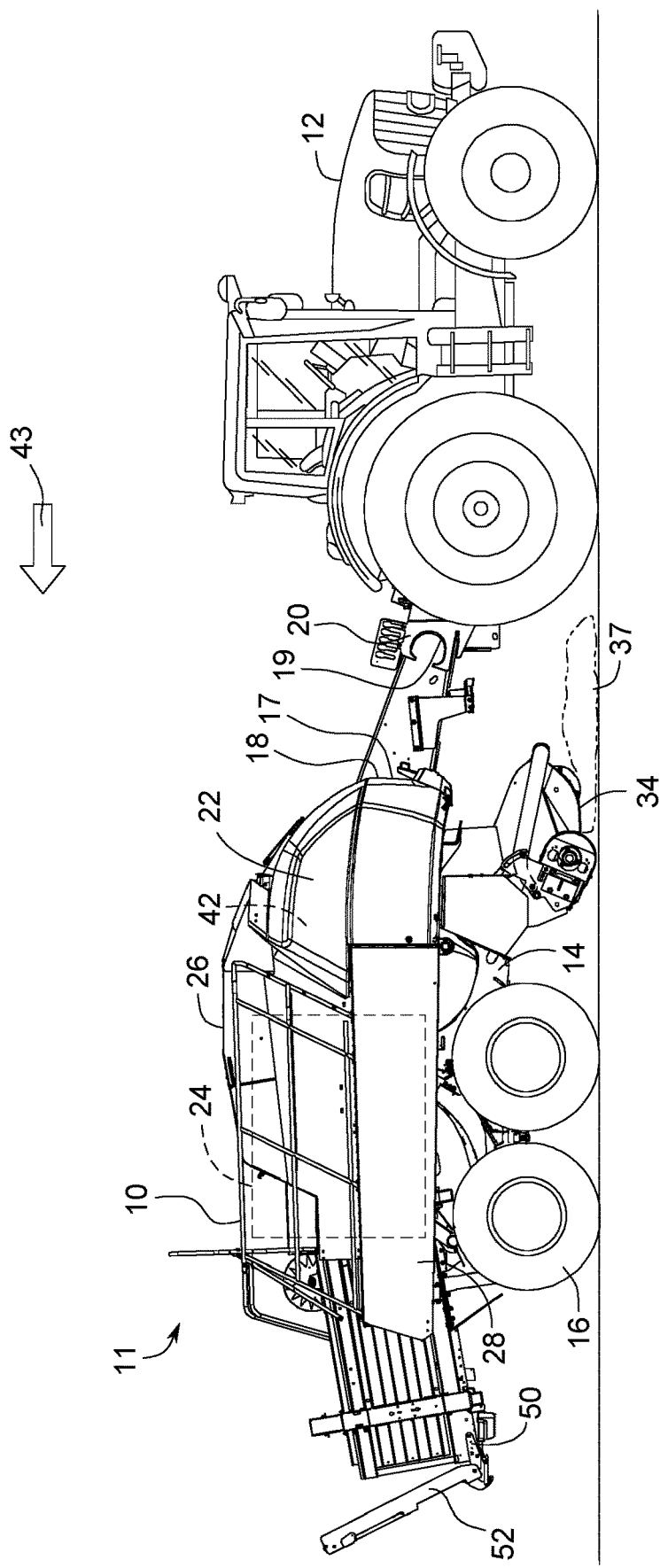
FIG. 1 is a side view of an example baler being transported by a tractor, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to square balers and, particularly, to bale chutes of a square baler and systems and methods for controlling a configuration of the bale chute during operation of an agricultural vehicle. The present disclosure provides for improved safety of a square baler and an agricultural vehicle system that includes a square baler by providing devices for interlocking a bale chute in a raised or retracted position and control systems for determining when a bale chute may be retracted into the retracted position so as to avoid or reduce a risk of damage to external objects or persons, such as pedestrians or other vehicles. Consequently, without in any way limiting the scope, interpretation, or application of the claims appearing below, a technical effect of the various implementations described herein is to improve safety associated with a baler and, particularly, to safety associated with the bale chute of a baler.

Although the present disclosure describes various implementations involving square balers, the scope of the disclosure is not so limited. In other implementations, the devices, systems, and methods described herein may be applicable to other types of balers. Consequently, the devices, systems, and methods described herein are provided merely as examples and are not intended to be limiting.

Figure 2:
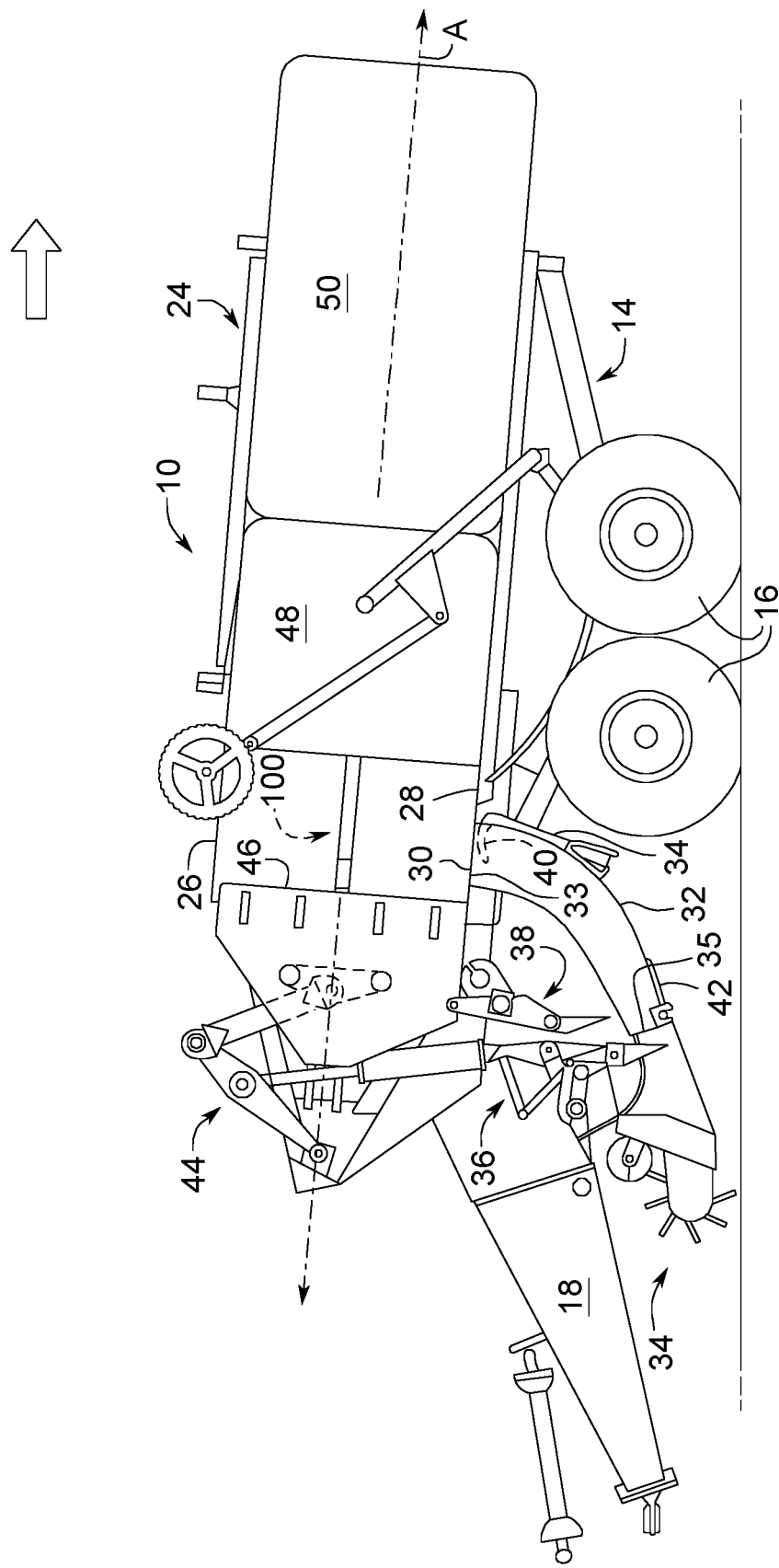
FIG. 2 is a side view of another example baler, according to some implementations of the present disclosure.
Figure 3:
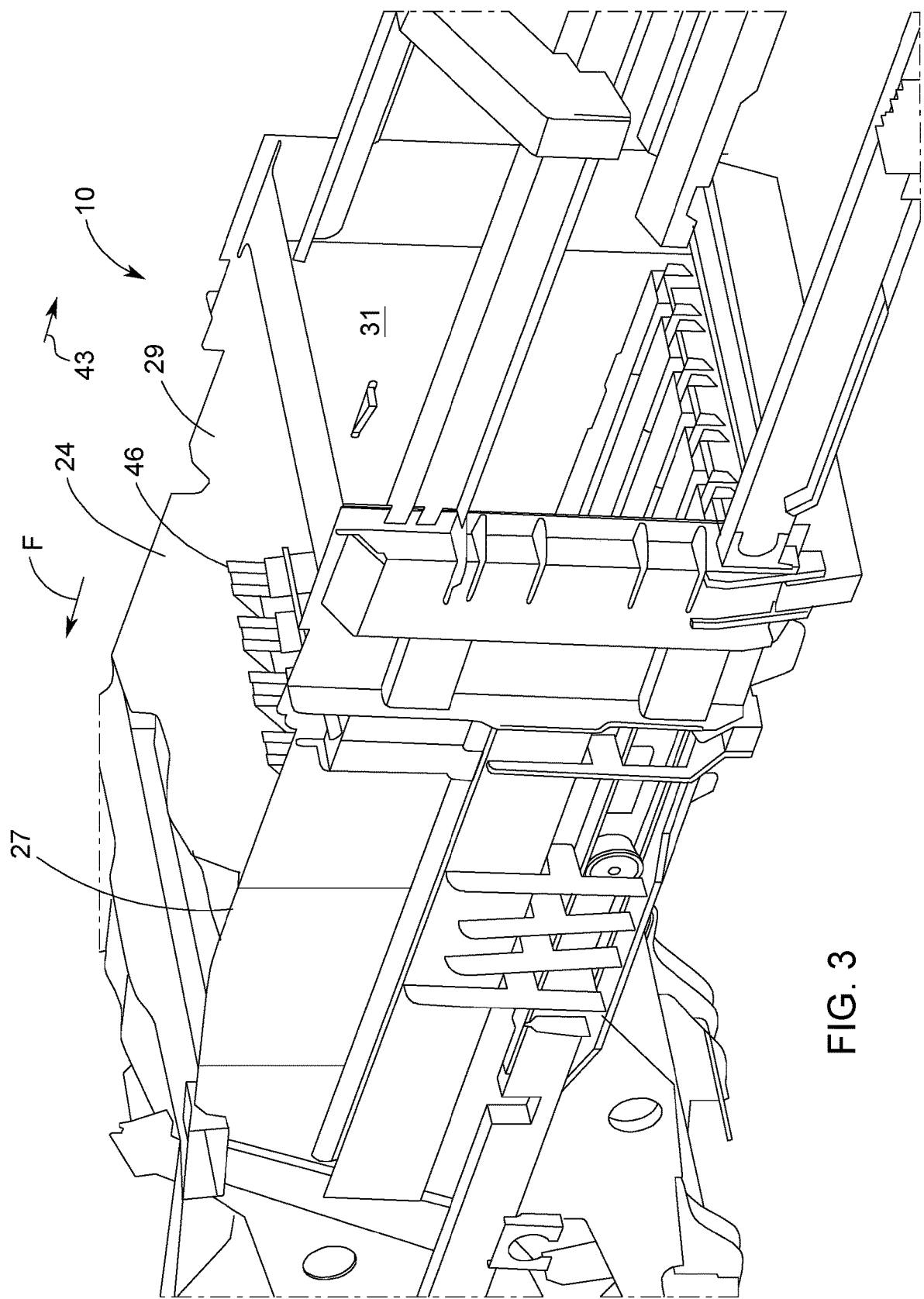
FIG. 3 is a perspective view of a portion of an example baler, according to some implementations of the present disclosure.

FIGS. 1-3 show a baler 10. FIG. 1 is a side view of an example agricultural vehicle 11 that includes the baler 10 connected to a tractor 12. The baler 10 is configured to be towed by the tractor 12, and, in the illustrated example, the baler 10 is a square baler. The baler 10 includes a main frame 14 supported on ground wheels 16. The main frame 14 includes a draft tongue 18 having a first or rearward end 17 joined to the main frame 14 and a second or forward end 19 defined by a clevis arrangement 20 adapted for being coupled to a drawbar (not shown) of the tractor 12.

The main frame 14 supports a housing 22 that defines a baling chamber 24. With reference to FIGS. 2 and 3, the baling chamber 24 includes substantially parallel top and bottom walls 26 and 28, respectively and opposite, parallel side walls 27 and 29, which are all arranged so as to defines a cavity 31 having a square or rectangular cross-sectional shape. The bottom wall 28 is provided with a crop inlet 30 to which is coupled a first or upper end 33 of a pre-compression chamber 32 in the form of a duct that curves upwardly and rearwardly from a crop pick-up 34. Located in the region between the crop pick-up 34 and the pre-compression chamber 32 is a feeder fork arrangement 36 that operates to move crop material 37 into a second or forward 35 end of the pre-compression chamber 32. Transversely spaced tines of a pivotally mounted crop blocking fork 40 are selectively movable between a crop retaining position, as shown, wherein they extend through over an upper edge of a back wall of the pre-compression chamber 32 at a location adjacent the crop inlet 30 of the baling chamber 24, and a rearwardly pivoted crop release position, for permitting an accumulated charge of the crop material 37 to be moved into the baling chamber 24 through operation of a stuffing fork 38. The stuffing fork 38 has transversely spaced forks that move down through slots provided in a front wall of the pre-compression chamber 32, and then sweep upwardly through the pre-compression chamber 32 to move the charge of the crop material 37 into the baling chamber 24. Actuators, not shown, are associated with the blocking fork 40 and stuffing fork 38 and are associated with controls that are sequenced to effect retraction of the blocking fork 40 and then operation of the stuffing fork 38 once the charge of the crop material 37 has reached a pre-selected density as determined by a spring loaded, density sensing door 42.

Once the charge of the crop material 37 has been moved into the baling chamber 24, the crop material 37 is moved rearwardly in the direction of arrow 43 by operation of a plunger drive 44 acting on a plunger 46 which compresses the charge of the crop material 37 against a partially formed bale 48 and a completely formed bale 50 which has already been bound together by several transversely spaced loops of twine that are installed by operation of a twine tying arrangement (not shown). Referring again to FIG. 1, the formed bale 50 is moved from the cavity 31 and onto a bale chute 52 that extends at a discharge end 54 of the baler 10.

FIGS. 4-7 illustrate retraction of the bale chute 52 from a lowered or extended position 56 to a raised or retracted position 58. The bale chute 52 is movable between an extended position 56 and retracted position 58 by an actuator 60 and linkage 62. In some implementations, the actuator 60 is a linear actuator, such as an electric, pneumatic, or hydraulic linear actuator. In other implementations, the actuator 60 may be a rotary actuator. However, the actuator 60 may be any actuator operable to actuator the linkage 62 to move the bale chute 52 between the extended and retracted positions. The actuator 60 may be, for example, electrically operated, pneumatically operated, or hydraulically operated. In some implementations, the actuator 60 and the linkage 62 may be laterally centered along the baler 10. In other implementations, one or both of the actuator 60 and the linkage 62 may be laterally located at a position other than centrally located. The actuator 60 is pivotally coupled to the frame 14 of the baler 10 at a pinned connection 61. Consequently, the actuator 60 is pivotally coupled to the housing 22.

Figure 8:
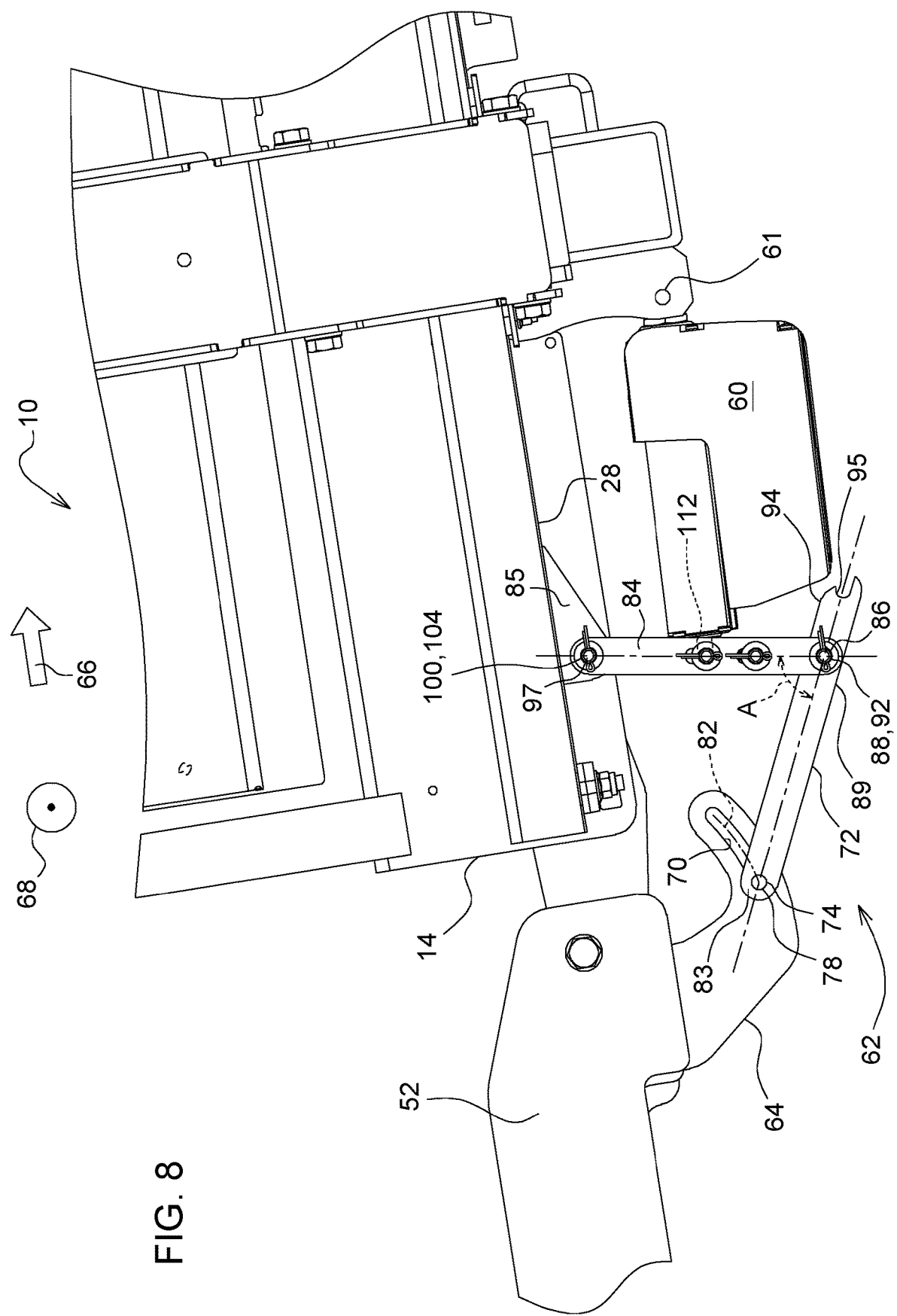
FIG. 8 is a detail view of a linkage assembly and an actuator operably coupled to move a bale chute between an extended position and a retracted position and vice versa, according to some implementations of the present disclosure.

Referring to FIG. 8, the bale chute 52 includes generally U-shaped brackets 64 laterally offset from each, i.e., offset from each other in a direction corresponding to arrow 68 (shown as extending out of the surface of the drawing sheet) that is perpendicular to a longitudinal axis 66. Corresponding curved slots 70 are formed in the brackets 64. A first set of links 72 connects to the brackets 64 via a first pin 74 received in the slots 70 and apertures 78 formed in first ends 80 of the links 72. The links 72 are laterally offset from each other. The first pin 74 is slideable within and along a curved path 82 defined by the slots 70.

Generally, with the bale chute 52 in either the extended or retracted positions, the first pin 74 resides at a first end 83 of the slots 76. The slots 76 function to permit an upwards rotation of the bale chute 52 without applying potentially harmful loading through the linkage 62 and actuator 60. For example, if the bale chute 52 is in the extended position 56 and encounters an obstruction that applies a force tending to push the bale chute 52 towards the retracted position 58, the slots 76 allow the bale chute 52 to move relative to the linkage 62 by permitting the first pin 74 to slide within the slots 70. An amount by which the bale chute 52 is permitted to rotate upwards relative to the linkage 62 and actuator 60 in such circumstances corresponds to a length of the path 82 defined by the slots 76. The ability of the bale chute 52 to rotate upwards relative to the linkage 62 as described is applicable to any position of the bale chute 52 at and between the extended position 56 and the retracted position 58.

The first set of links 72 are pivotably connected to a second set of links 84. Similar to the first set of links 72, the second set of links 84 are laterally offset from each other and are connected to the first set of links 72 by a second pin 86. The second pin 86 extends through apertures 88 formed in first ends 90 of the links 84 and through apertures 92 formed at a location 89 between the first ends 80 and second ends 94 of the links 72 to pivotably connect the first and second set of links 72 and 84. The second ends 94 of the links 72 define grooves 95, whose operation is described in more detail below. The second set of links 84 are also pivotably connected to a brackets 85 that are coupled to the bottom wall 28. The brackets 85 are laterally offset from each other and are pivotably connected to the second set of links 84 via a third pin 97. The third pin 97 extends through apertures 100 formed in second ends 102 of the links 84 and apertures 104 formed in the brackets 85. The linkage 62 includes the first set of links 72 and the second set of links 84.

Figure 9:
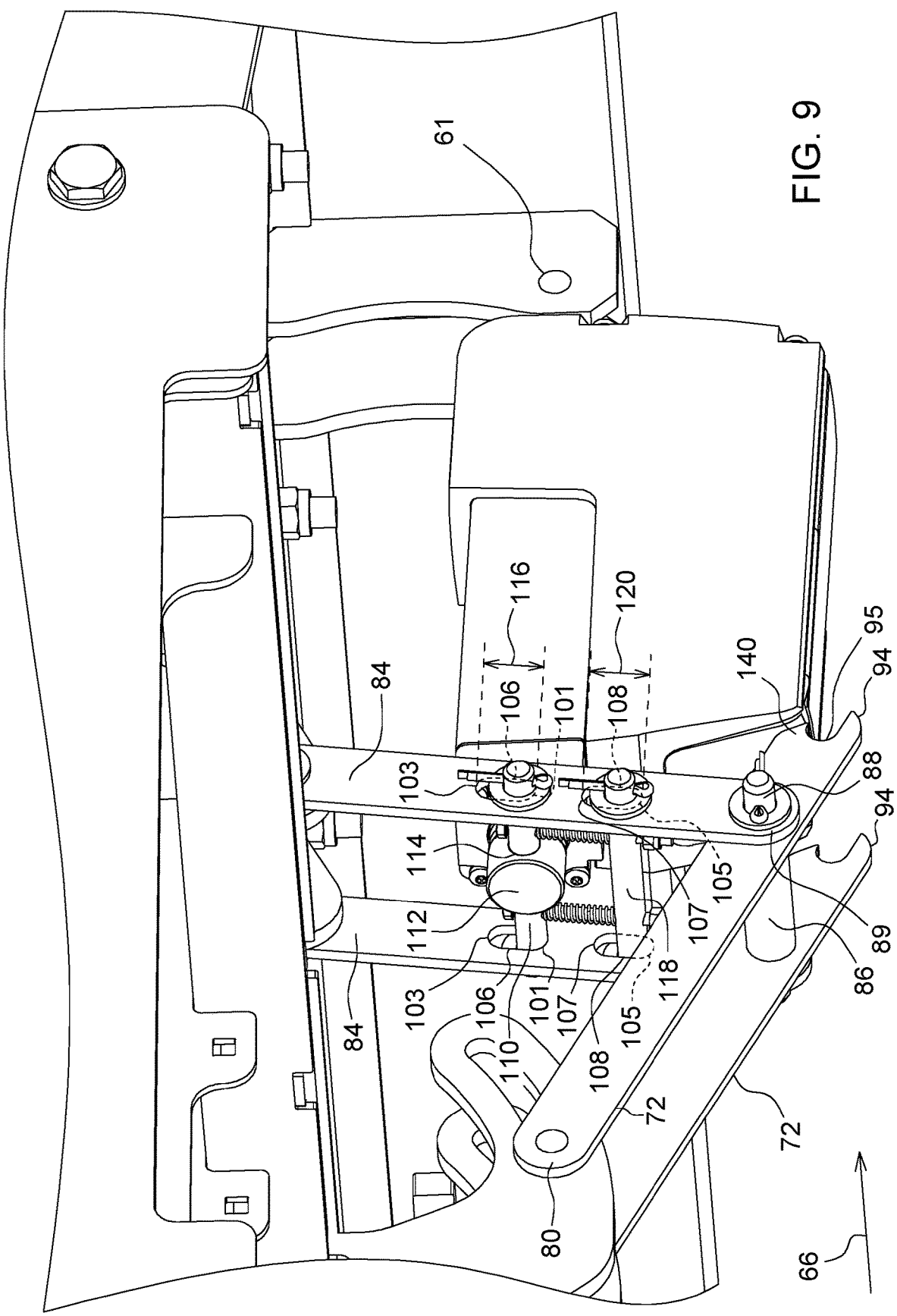
FIG. 9 is a perspective view of the linkage assembly and the actuator of FIG. 8.

The actuator 60 is connected to the linkage 62 via a pinned connection formed with the links 84. Referring to FIG. 9, a first set of slots 106 and a second set of slots 108 are formed in the links 84. A fourth pin 110 extends through the first set of slots 106. The fourth pin 110 is pivotably coupled to a moveable rod 112 of the actuator 60. Consequently, in the example of FIG. 9, the actuator 60 is a linear actuator having a moveable rod 112 that is operable to extend and retract to move the linkage 62 and bale chute 52 between the extended and retracted positions. In some implementations, the actuator 60 may be a hydraulic, pneumatic, or electric linear actuator. An example in which the actuator 60 is a rotary actuator is described in the context of FIG. 25, below. For example, in the illustrated example, the fourth pin 110 extends through an aperture 114 formed in the rod 112 of the actuator 60. The fourth pin 110 forms a pinned connection between the links 84 and the actuator 60. Consequently, the actuator 60 and the links 84 are pivotable relative to each other. Further, the fourth pin 110 is slideable within the slots 106 along a length 116 of the slots 106. A fifth pin 118 extends through the slots 108 formed in the links 84 and is slideable therein along a length 120 of the slots 108.

The slots 106 include a first end 101 and a second end 103, and the slots 108 include a first end 105 and a second end 107. As shown in FIG. 9, with the bale chute 52 in the raised or retracted position 58, the pins 110 and 118 are in contact with the first ends 101 and 103, respectively, of the slots 106 and 108, respectively.

In some implementations, each of the pins 74, 86, 97, 110, and 118 may be retained, at at least one end, using a cotter pin extend through transvers bores formed at opposing ends of the respective pins 74, 86, 97, 110, and 118. In other implementations, the pins 74, 86, 97, 110, and 118 may be retained in other ways, such as with threaded nuts, end caps, flared or flanged ends, or a combination of these. However, other types of retention features may also be used to retain the pins 74, 86, 97, 110, and 118 in position within the linkage 62 and are within the scope of the present disclosure.

Figure 10:
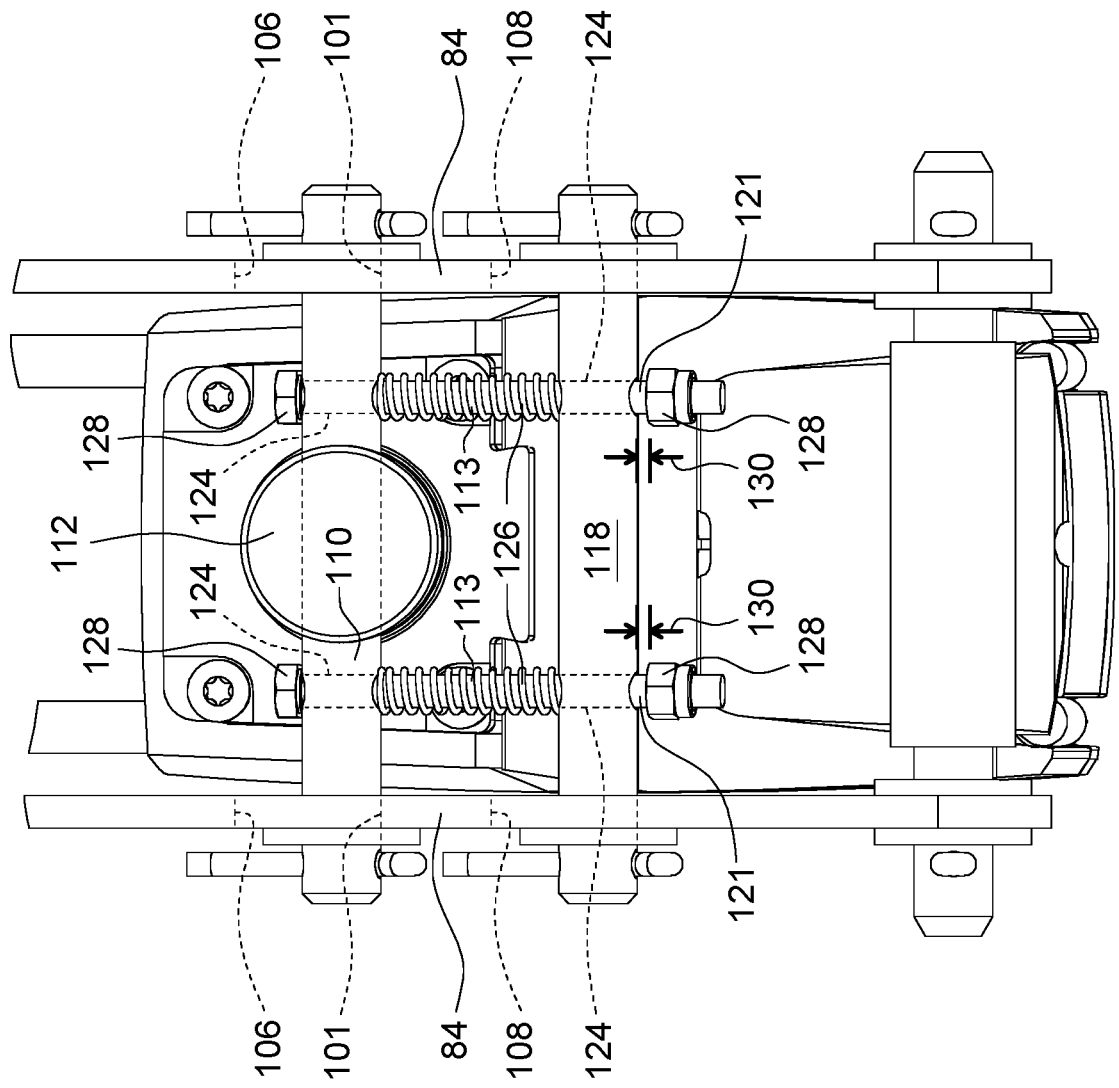
FIG. 10 is an end view of a portion of a linkage system operable to adjust a position of a bale chute, according to some implementations of the present disclosure.
Figure 11:
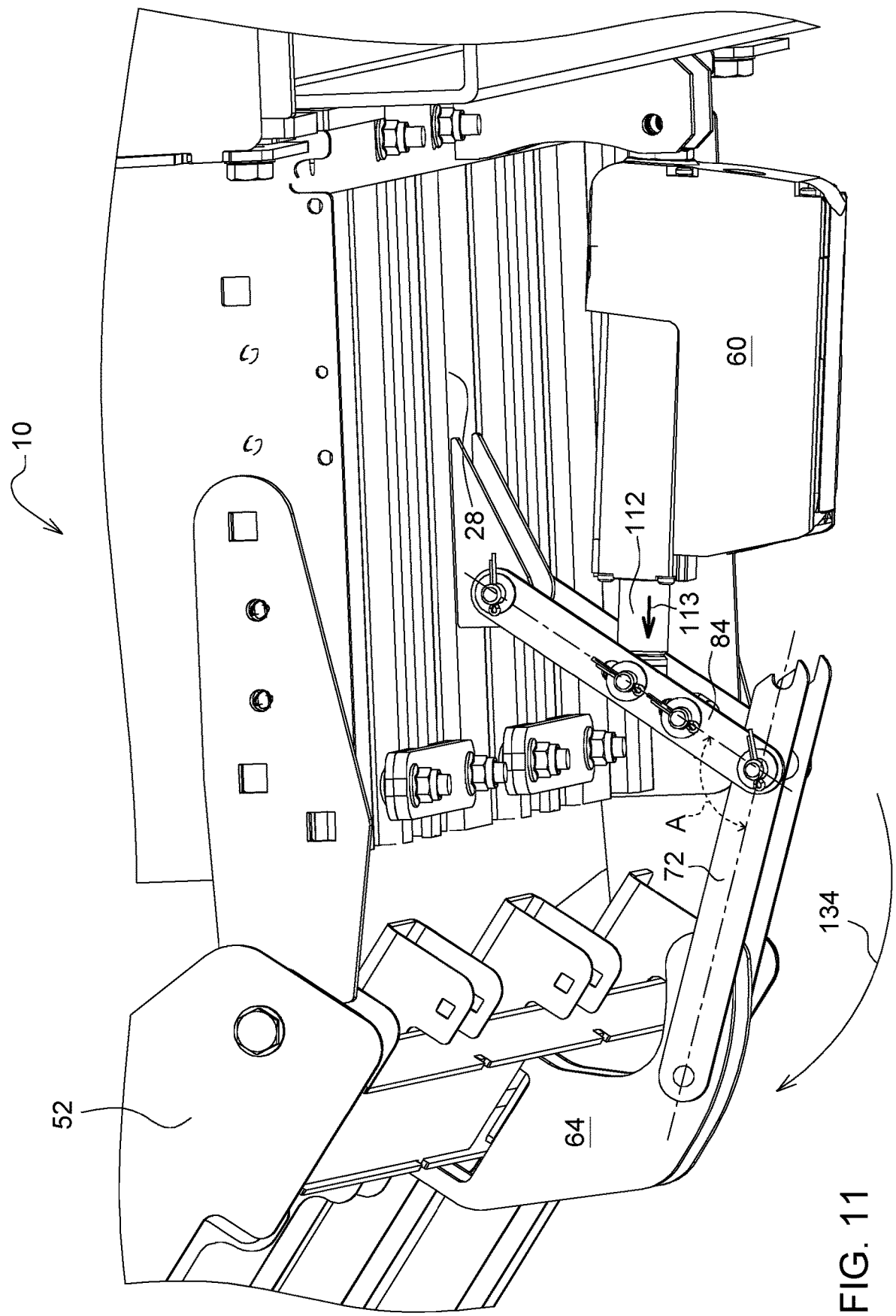
FIG. 11 is another perspective view of the linkage assembly and the actuator of FIG. 8.

FIG. 10 is an end view of a portion of the linkage 26 showing the links 84 and pins 110 and 118. As shown in FIG. 10, rods 122 are located on opposing lateral sides of the rod 112 and extend through apertures 124 formed in the pins 110 and 118. The rods 121 extend through respective springs 126 that are captured on the respective rods 113 by the pins 110 and 118. The springs 126 are in a compressed state such that the springs 126 exert a force configured to separate the pins 110 and 118. Retaining fasteners 128 are coupled at ends of each rod 121. A distance between the fasteners 128 are such that a gap 130 is formed between one of the fasteners 128 and the pin 118 when the other of the fasteners 128 abuts the pin 110. In some implementations, the fasteners 128 may be a nut or a nut and washer combination. In other implementations, one end of the rods 121 may be flared or flanged such that the rods 121 are prevented from passing completely through the apertures 124. In the illustrated example, with the rod 112 in a retracted position and with the bale chute 52 in the extended or lowered position, the rod 112 is positioned relative to the links 84 such that the pin 110 resides at first ends 101 of the slots 106.

Figure 4:
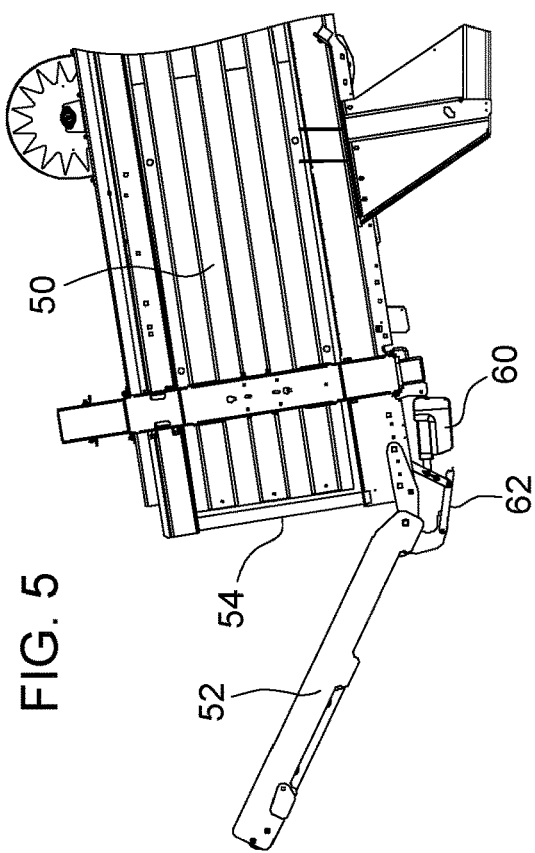
FIGS. 4 through 7 are side views of an end of an example baler showing a bale chute moving between an extended position and a retracted position.
Figure 5:
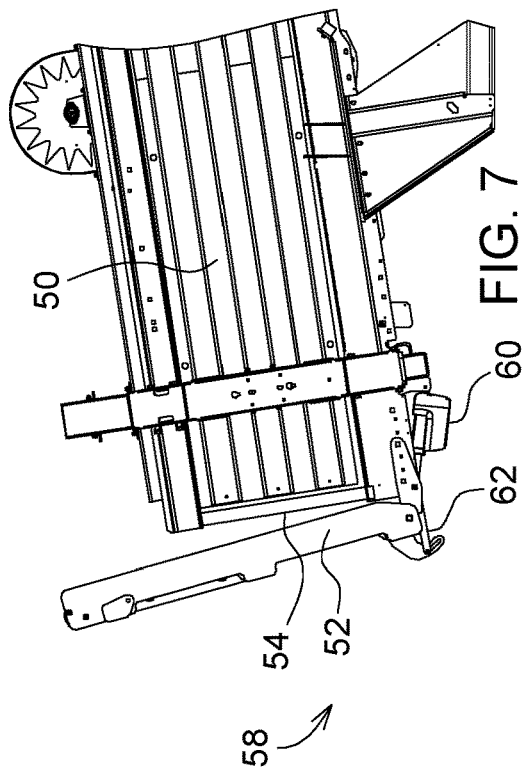
Figure 6:
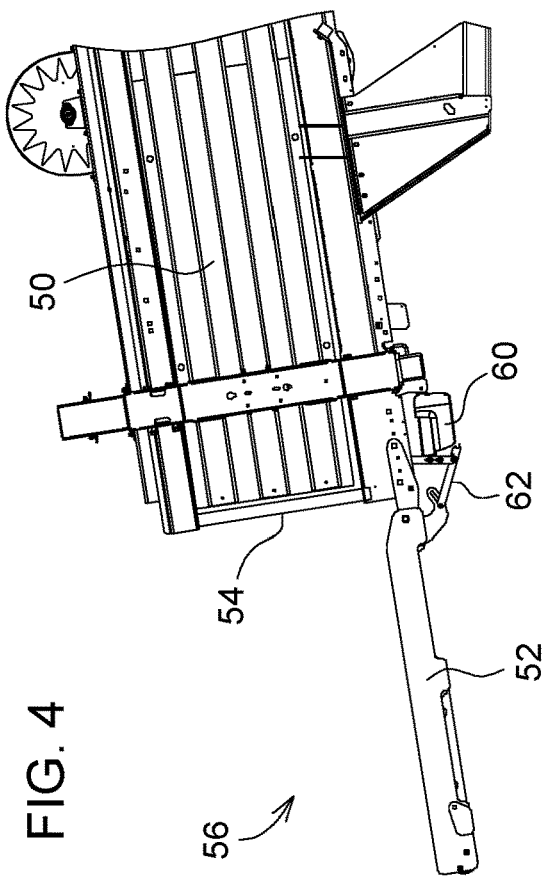
Figure 7:
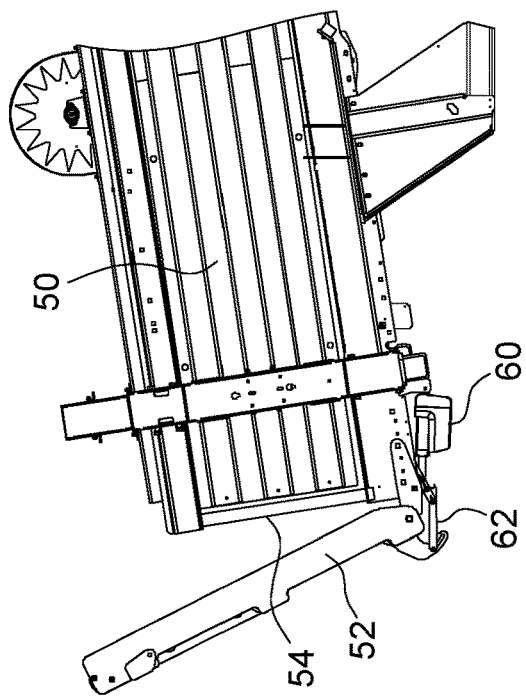

Operation of the bale chute 52 is now described with reference to FIGS. 11-20. Starting with the bale chute 52 in the extended position, as shown in FIGS. 4, 8, and 9, the actuator 60 extends the rod 112 in a first direction of arrow 117 such that the links 84 rotate towards the bottom wall 28 in the direction of arrow 134. As the rod 112 continues to extend and the links 84 continue to rotate in the direction of arrow 134, the links 72 and 84 begin to align. That is, as the rod 112 continues to extend, an angle A (shown in FIG. 8), formed between the links 72 and 84 increases.

Figure 12:
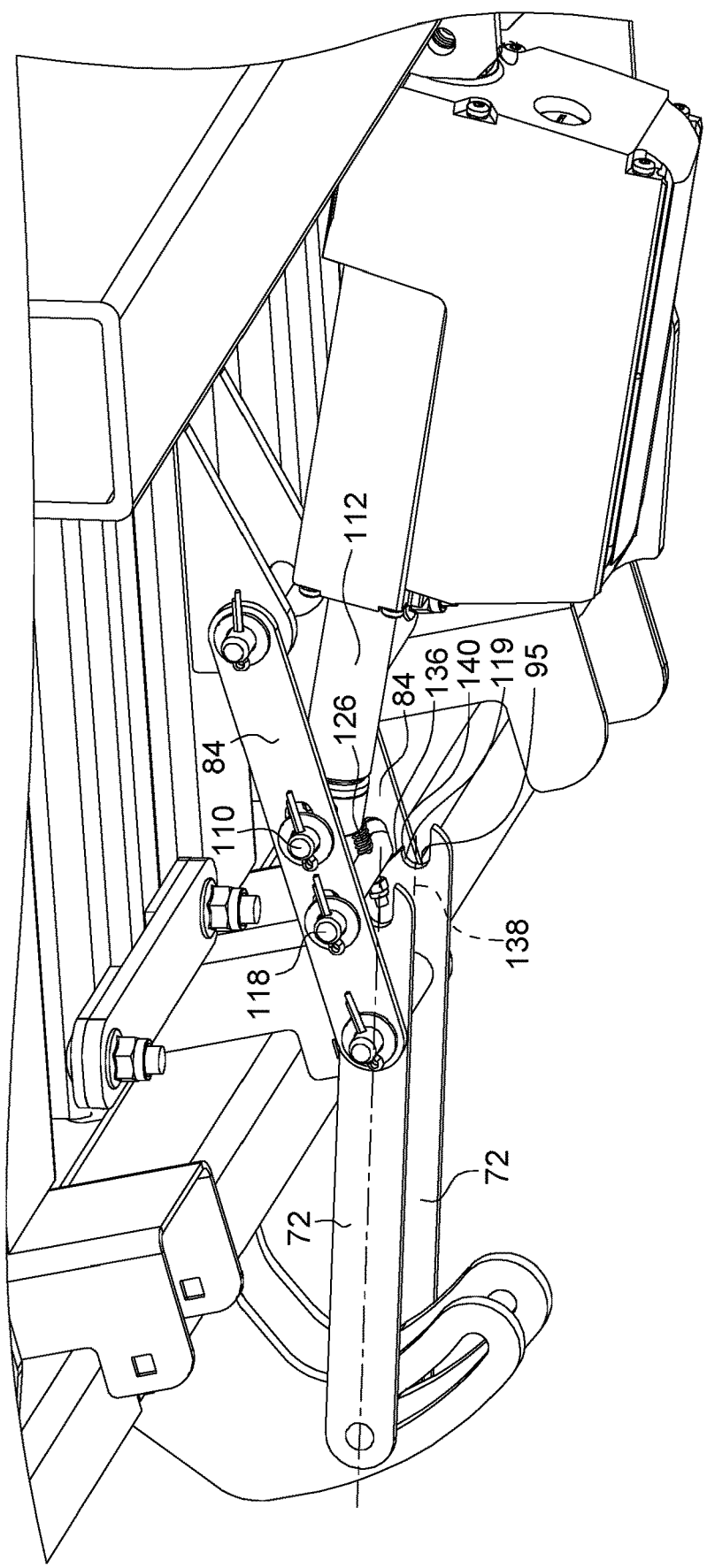
FIG. 12 is a detail view of ends of a first set of links and a second set of links of the linkage system of FIG. 8.
Figure 13:
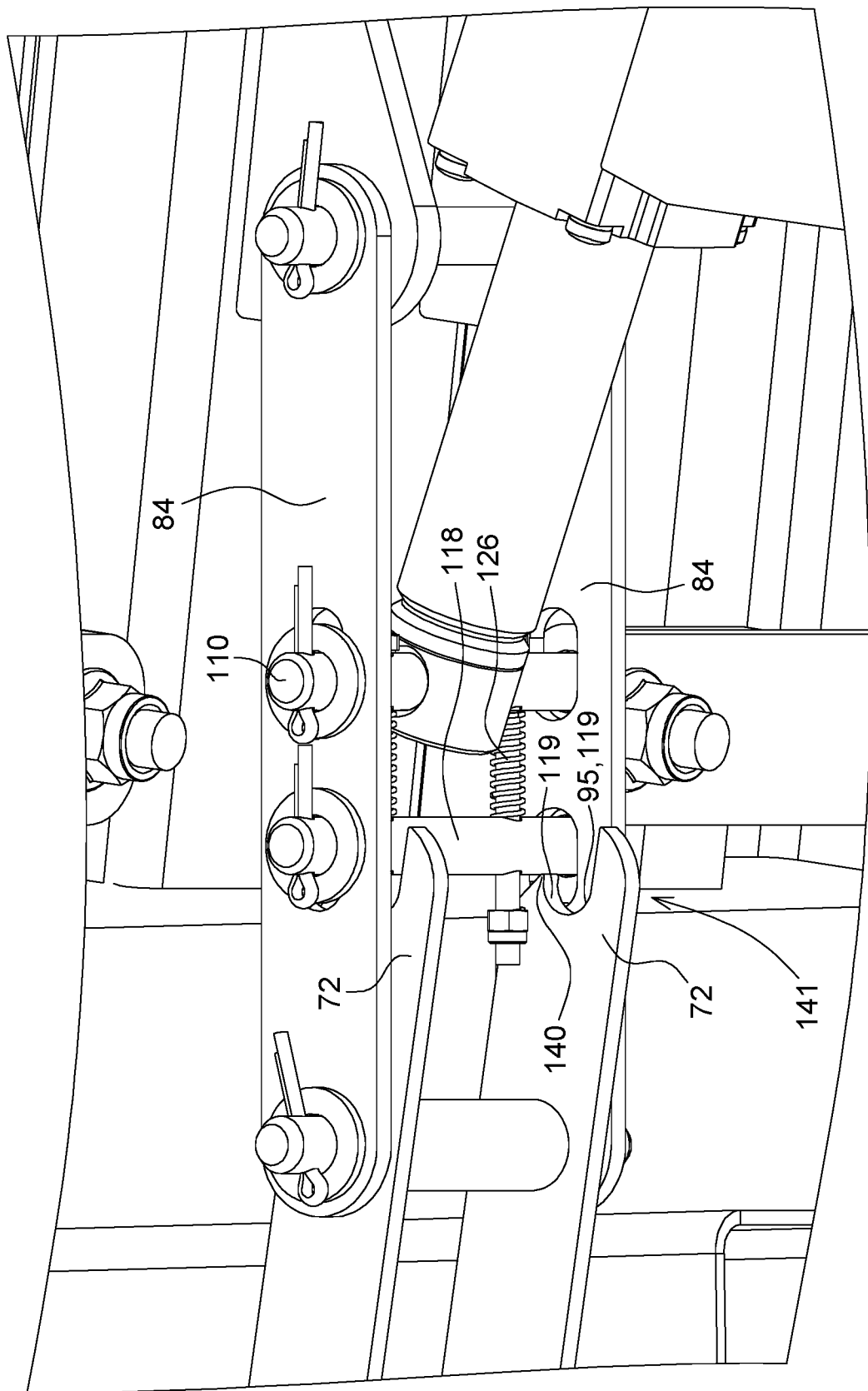
FIG. 13 is another detail view of the ends of the first set of links of the linkage assembly of FIG. 8.
Figure 14:
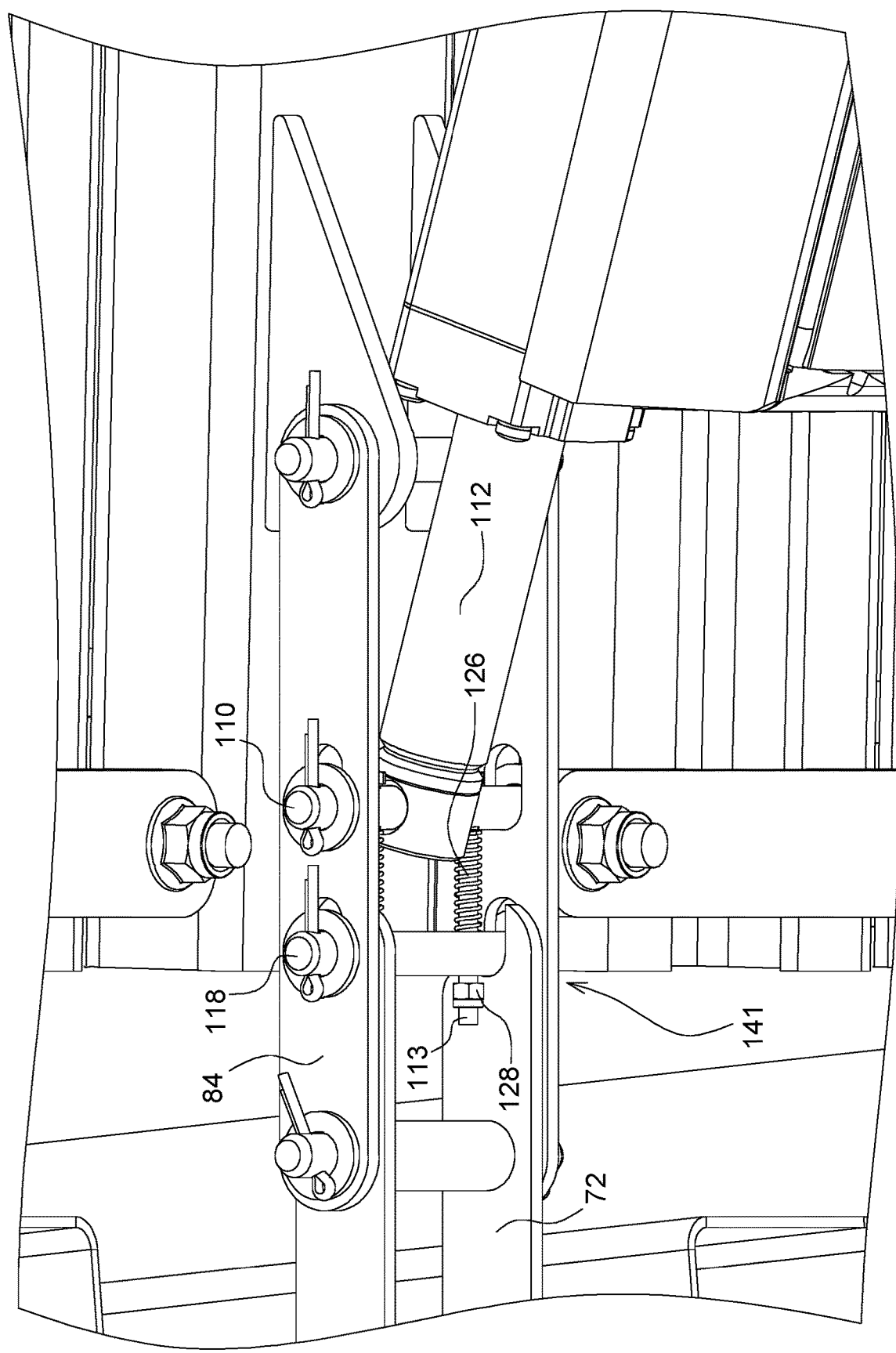
FIG. 14 is another detail view of the ends of the first set of links of the linkage assembly of FIG. 8 showing recesses formed in the ends of the first set of links receiving a pin to releasably lock the first set of links relative to the second set of links.

As the links 72 and 84 come into alignment, as shown in FIG. 12, a surface 136, angled relative to a centerline 138 of the link 72, engages the fifth pin 118. This engagement between the fifth pin 118 and the surfaces 136 causes the fifth pin 118 to move towards the fourth pin 110, thereby compressing spring 126. The grooves 95 operate as receptacles to receive the fifth pin 118. When the fifth pin 118 moves over tips 140 formed between the surfaces 136 and the grooves 95, as shown in FIG. 13, the fifth pin 118 comes into alignment with the grooves 95, at which time the springs 126 expand, causing the fifth pin 118 to move away from the fourth pin 110 and engage a surface 119 of the links 72 defining the groove 95, as shown in FIG. 14. With the fifth pin 118 received in the groove 95 and engaged with the surface 119, the linkage 62 is in a locked configuration.

In some implementations, the angle A is 180° when the fifth pin 118 is received into the groove 95. Further, in some implementations, the grooves 95 may laterally align with the slots 108 such that the surfaces 119 align with the first ends 105 of the slots 108.

As also shown in FIG. 14, with the fifth pin 118 fully seated in the groove 95 and in contact with surfaces 119, the fourth pin 110 is engaged with the first ends 101 of the slots 106. In this condition shown in FIG. 14, the grooves 95 capture the fifth pin 118, preventing relative pivoting movement of the links 72 relative to the links 84. Consequently, in this condition, the bale chute 52 is locked in the retracted position 58. Additional rotational movement of the bale chute 52 is possible as a result of the interaction between slots 70 and the first pin 74, as described above. In some implementations, grooves 95, pins 110 and 118, slots 106 and 108, springs 126, and rods 121 combine to form a lock assembly 141 that is operable to lock the bale chute 52 in the retracted position and, in response to retraction of the actuator 60, release the bale chute 52 when the bale chute 52 is moved to the extended position. In other implementations, the lock assembly 141 may include additional or fewer components.

Figure 15:
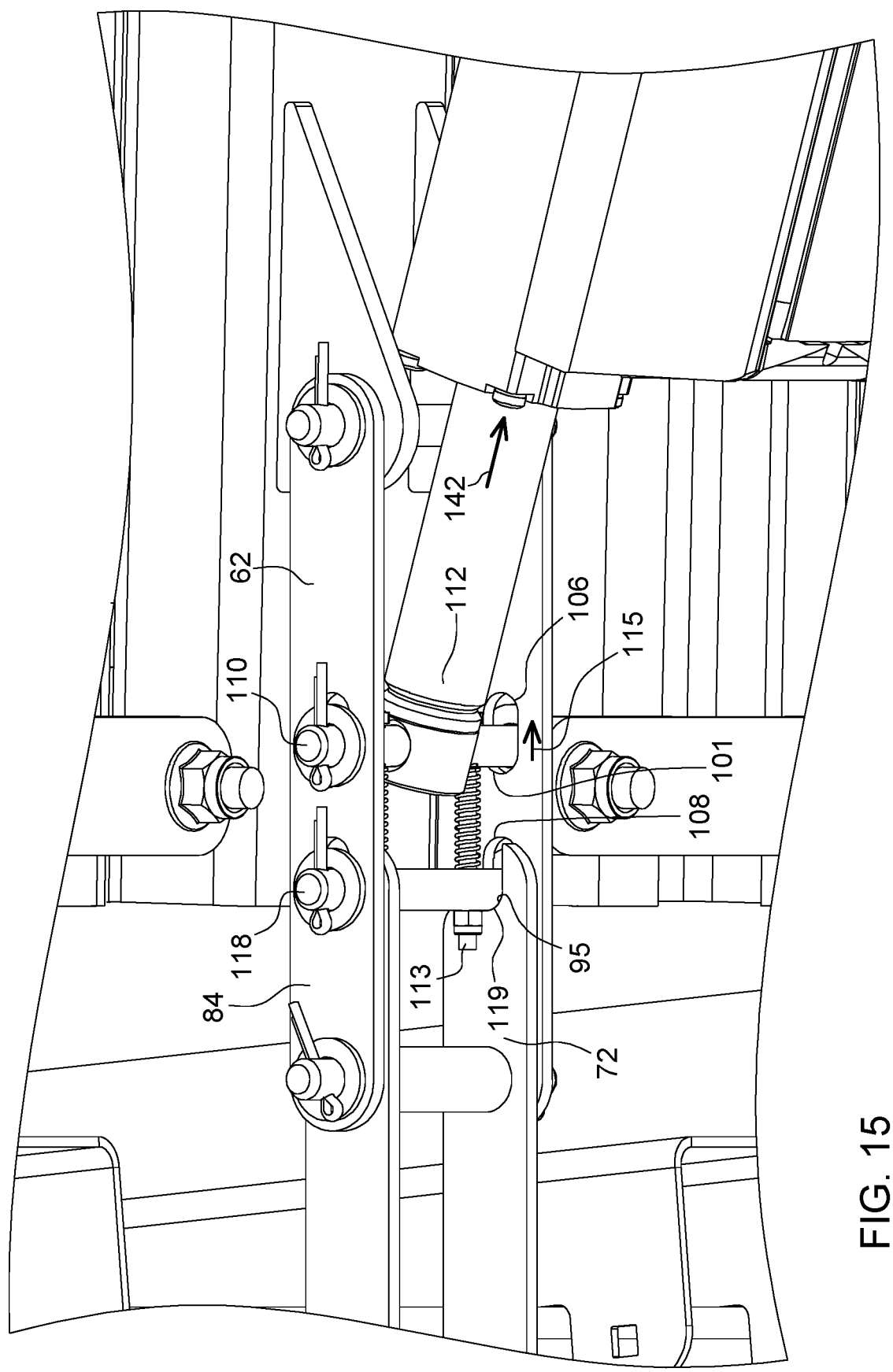
FIGS. 15-17 are additional detail views of the linkage assembly of FIG. 8.

Referring to FIG. 15, in some implementations, the rod 112 may be retracted in a second direction of arrow 142, opposite the first direction 117, by a selected amount to cause the fourth pin 110 to move within the slots 106 in the direction of arrow 115 away from contact with the ends 101 thereof. In some implementations, an amount by which the fourth pin 110 is displaced within the slots 106 as a result of retraction of the rod 112 may be in the range of one or two millimeters (mm), for example. The selected amount may be any amount that is operable to withdraw the fourth pin 110 from the first ends 101 of the slots 106 while not removing the fifth pin 118 from contact with the surfaces 119 defining the grooves 95. For example, where the slots 95 align with the first ends 105 when the fifth pin 118 is received within the grooves 95, the selected distance may be a distance less than the gap 130. In such cases, the fifth pin 118 remains in contact with the surfaces 119 as a result of the biasing force of the spring 126 notwithstanding the retraction of the fourth pin 110 within the slots 106 as a result of the retraction of the rod 112.

Retraction of the fourth pin 110 with the slots 106 away from the first ends 101 as described provides for interlocking of the first and second links 72 and 84 to lock the bale chute 52 into the retracted position 58 while also isolating and protecting the actuator 60 from loading that may be applied through the linkage 62. Isolating the actuator 60 in this way reduces or eliminates the risk of damage to the actuator 60 as a result of such loading.

Figure 16:
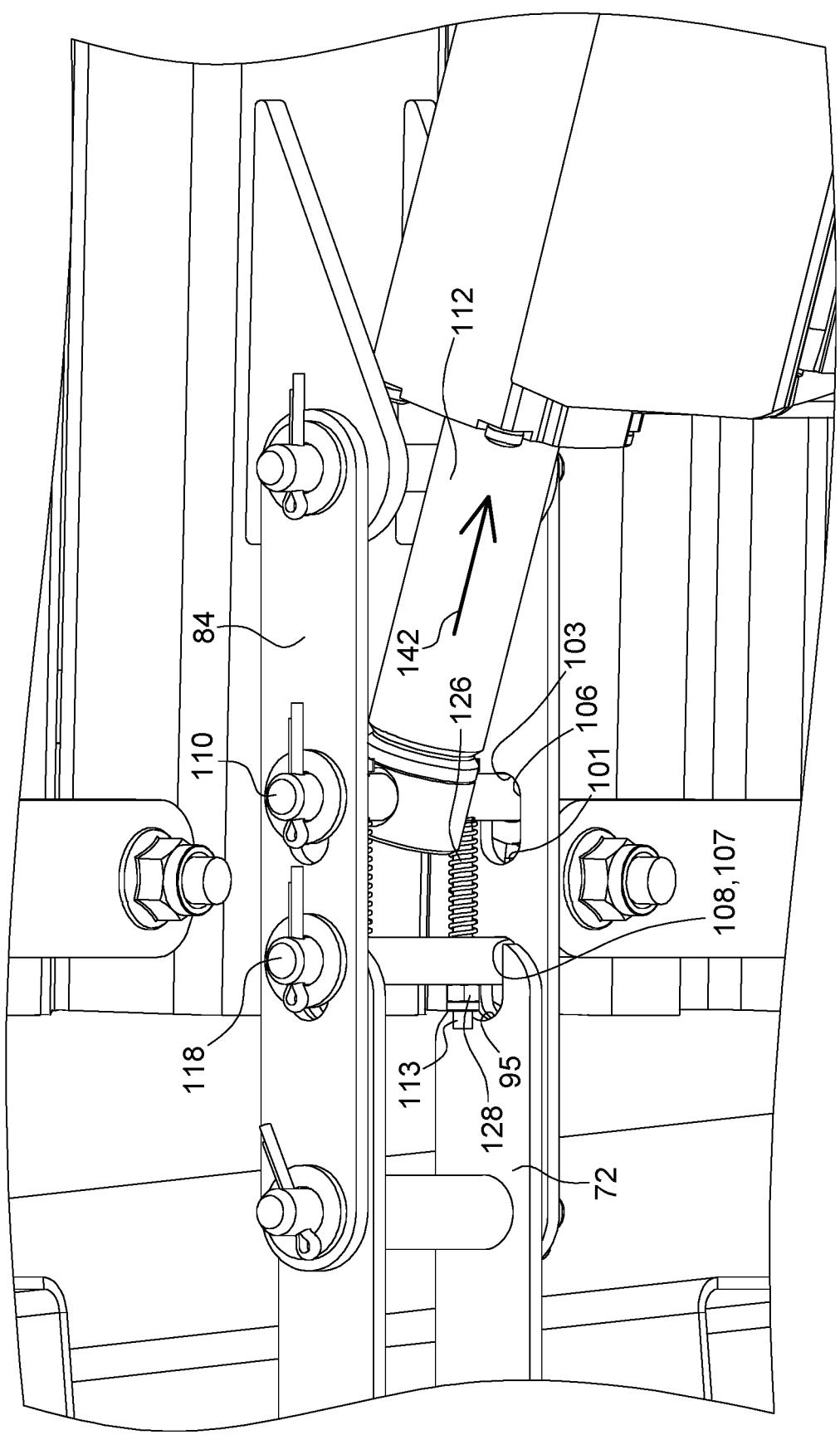
Figure 17:
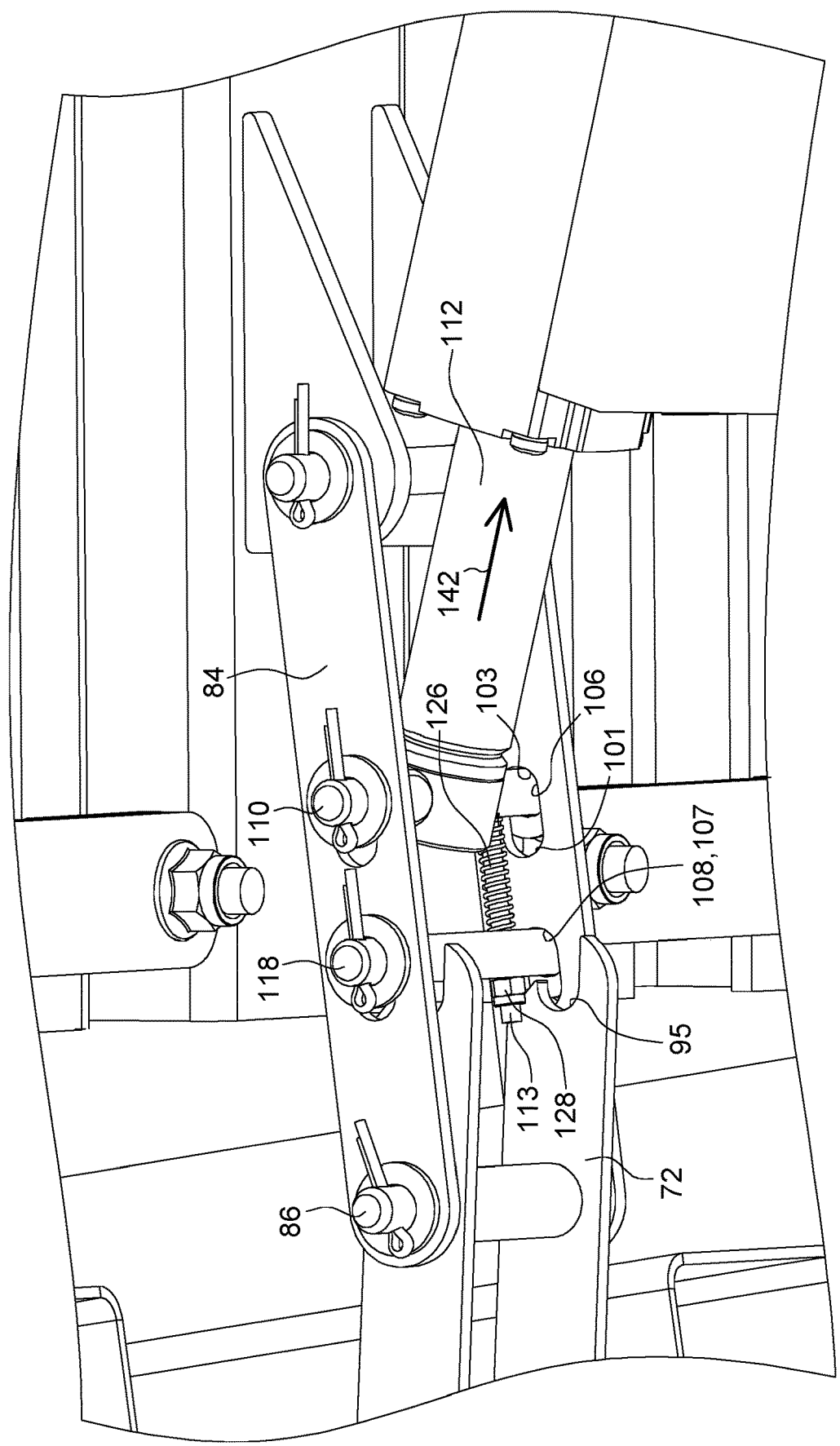
Figure 18:
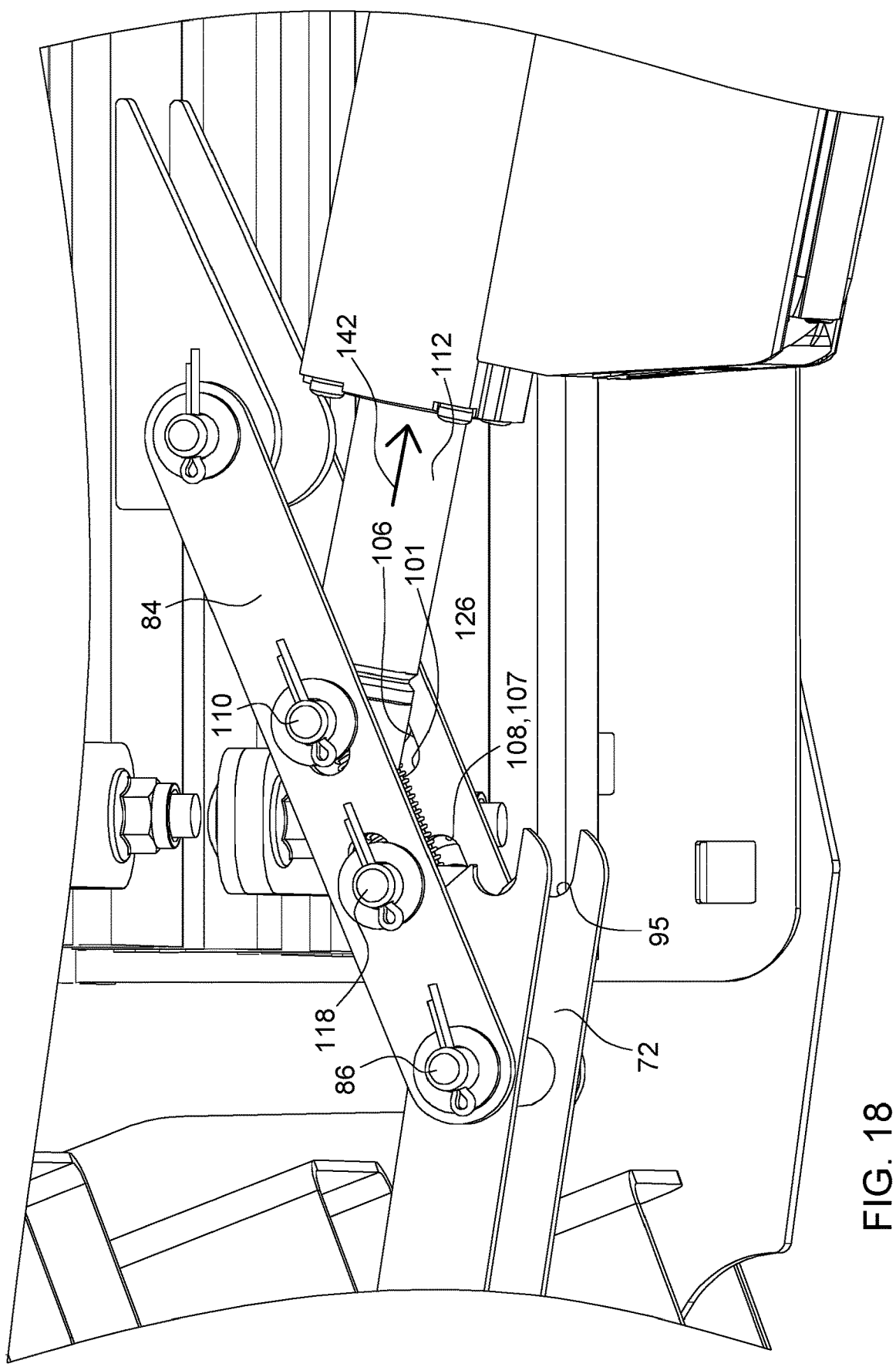
FIG. 18 is another perspective view of the linkage system and the actuator of FIG. 8

FIGS. 16 through 18 illustrate extension of the bale chute 52 into the extended position 56 in response to retraction of the plunger rod 112 of the actuator 60. In FIG. 16, the rod 112 is retracted in the direction of arrow 142, causing the fourth pin 110 to move away from the first ends 101 and towards the second ends 103 of the slots 106. With this movement, the springs 126 cause the fourth pin 110 and the fifth pin 118 to separate until the gap 130 is fully exhausted and the pins 110 and 118 are fully separated and contact respective fasteners 128. With the pins 110 and 118 fully separated, additional movement of the fourth pin 110 towards the second ends 103 of the slots 106 in response to retraction of the rod 112, the fifth pin 118 is simultaneously moved towards the second ends 107 of the slots 108. As the fifth pin 118 is moved towards the second ends 107, the fifth pin 118 is withdrawn from the grooves 95. When the fifth pin 118 is fully withdrawn from the groove 95 such that the fifth pin 118 is withdrawn past the tips 140 (shown, for example, in FIG. 12), the links 72 and operable to pivot relative to the links 84, as shown in FIG. 17. As the actuator 60 continues to retract the rod 112, the links 72 pivot relative to the links 84 about the second pin 86, resulting in the angle A being reduced. The angle A continues to increase with retraction of the rod 112 is until the bale chute 52 is in the extended position 58, as shown in FIG. 8.

Figure 19:
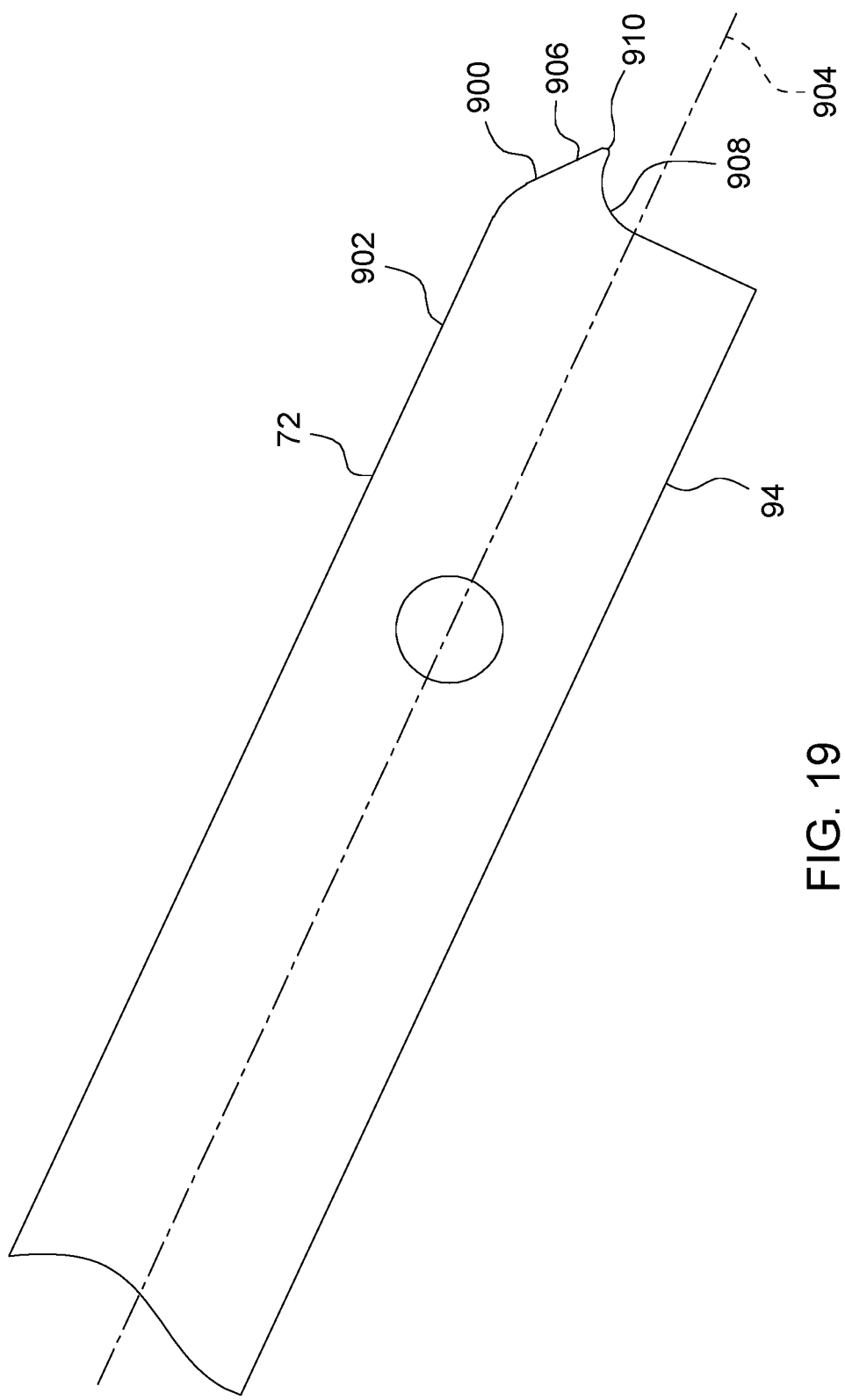
FIG. 19 is a detail view of ends of a set of links of another linkage system, according to some implementations of the present disclosure.

FIGS. 19, 20, 21, and 22 show an alternative implementation in which the second ends 94 of the links 72 include a protrusion 900. Referring to FIG. 19, the protrusion 900 extends longitudinally and is formed at a first side 902 of the link 72 relative to centerline 904. The protrusion 900 includes a first surface 906 angled relative to the centerline 904 and is similar to operates similar to the surface 136 described above. The protrusion 900 also includes a second surface 908 opposite the first surface 906. The first surface 906 and the second surface 908 meet at a tip 910. In some implementations, the second surface 908 is a curved surface adapted to conform to a shape of the fifth pin 118. Thus, the second surface 908 may represent a single-sided groove adapted to engage the fifth pin 118. The second surface 908 joins a third surface 912. For example, in some implementations, the second surface 908 joins the third surface 912 at the centerline 904. The third surface 912 may be flat and extend perpendicular to the centerline 904. The protrusion 900 extends longitudinally beyond the third surface 912.

Figure 20:
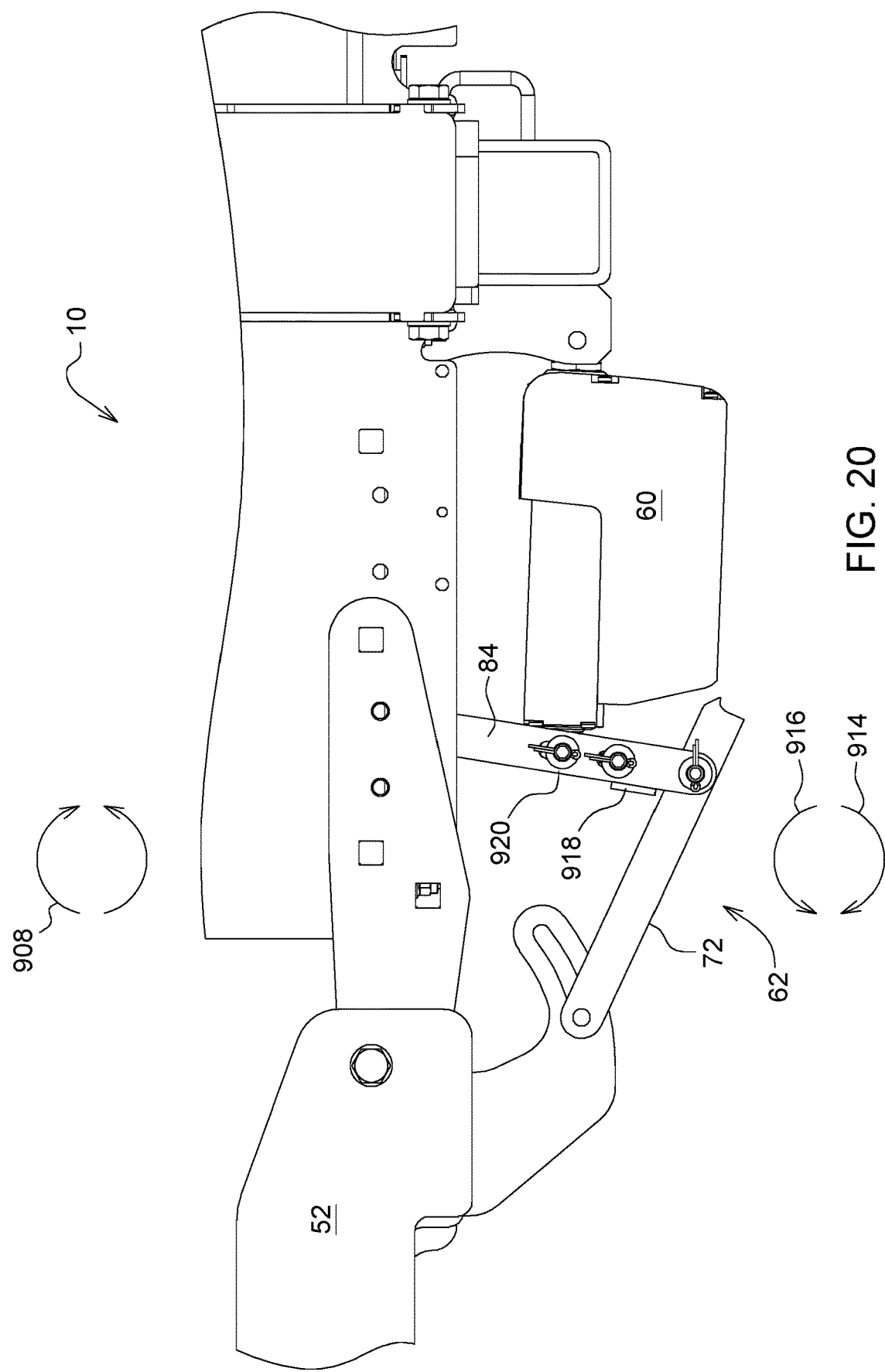
FIGS. 20-22 are detail views of another example linkage system and actuator of a baler, according to some implementations of the present disclosure.
Figure 21:
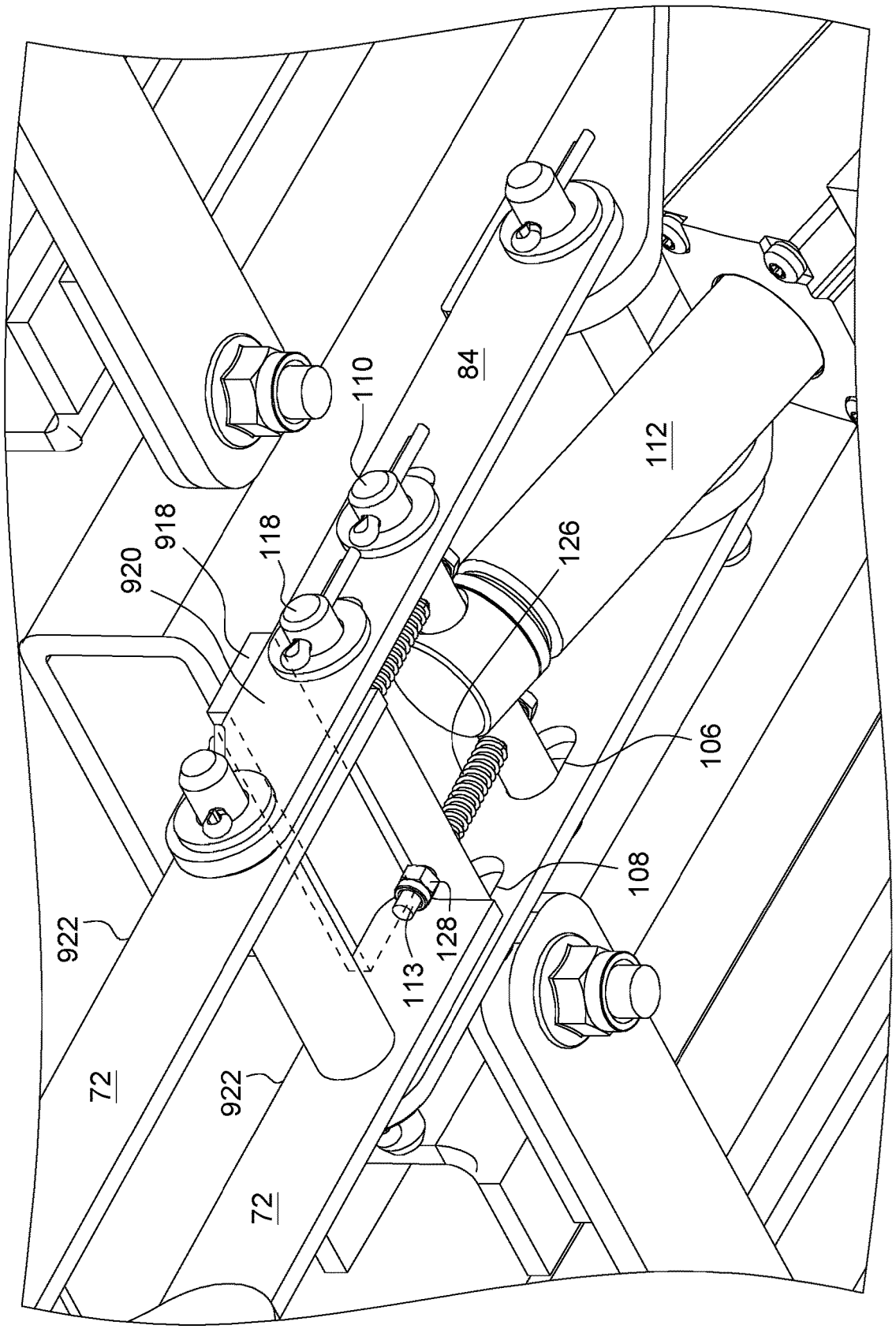
Figure 22:
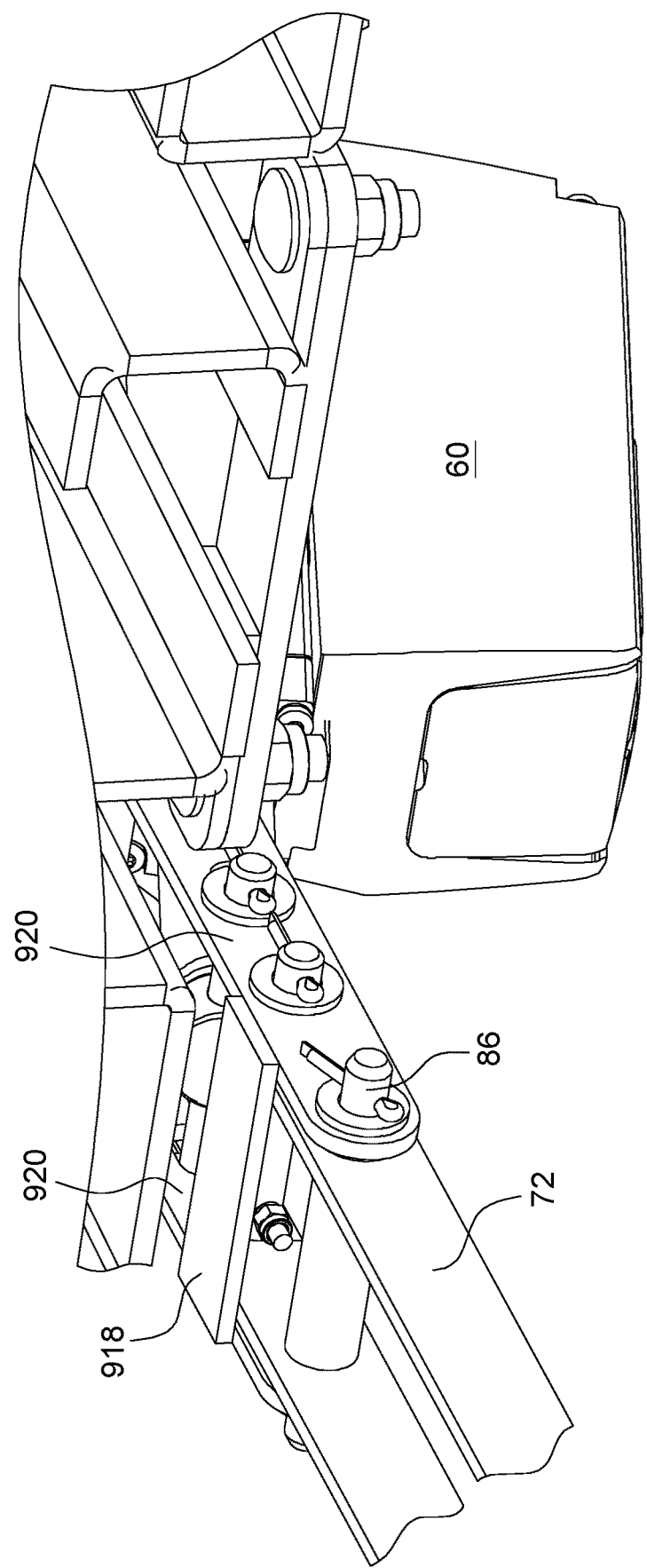

In operation, as the links 72 pivot relative to and come into alignment with the links 84, the fifth pin 118 engages the first surface 906 in a manner similar as to that described above. The fifth pin 118 is displaced relative to the fourth pin 110, compressing the springs 126. When the fifth pin 118 moves passed the tip 910, the biasing force of the compressed springs 126 urges the fifth pin 118 away from the fourth pin 110 and into contact with the second surface 908, placing the linkage 62 into a locked configuration. Engagement between the second surface 908, and the protrusion 900 more generally, and the fifth pin 118 prevents the links 72 from rotating relative to the links 84 in the direction of arrow 914, as shown in FIG. 20. The links 72 are also prevented from rotating in the direction of arrow 916 by a component 918 coupled to and extending between the links 84. As shown in FIGS. 20-22, the component 918 is in the form of a plate extending between the links 84 and connected to respective edges 920 of the links 84. The component 918 may be fixedly joined to the links 84 such that the links 84 and component 918 define a rigid assembly. The links 84 and component 918 may be joined by welding, adhesive, fastener, or another joining technique.

The component 918 is positioned along the links 84 so as to reside laterally adjacent to the ends 94 of the links 72 when the links 72 and 84 are in the locked configuration. The component 918 operates to prevent further rotation of the links 72 relative to the links 84 in the direction of arrow 916 by contacting edges 922 of the links 72, for example, near the ends 94, when the links 72 and 84 are in the locked configuration. With the linkage 62 in the locked configuration, the bale chute 52 is in the retracted position 58.

Figure 25:
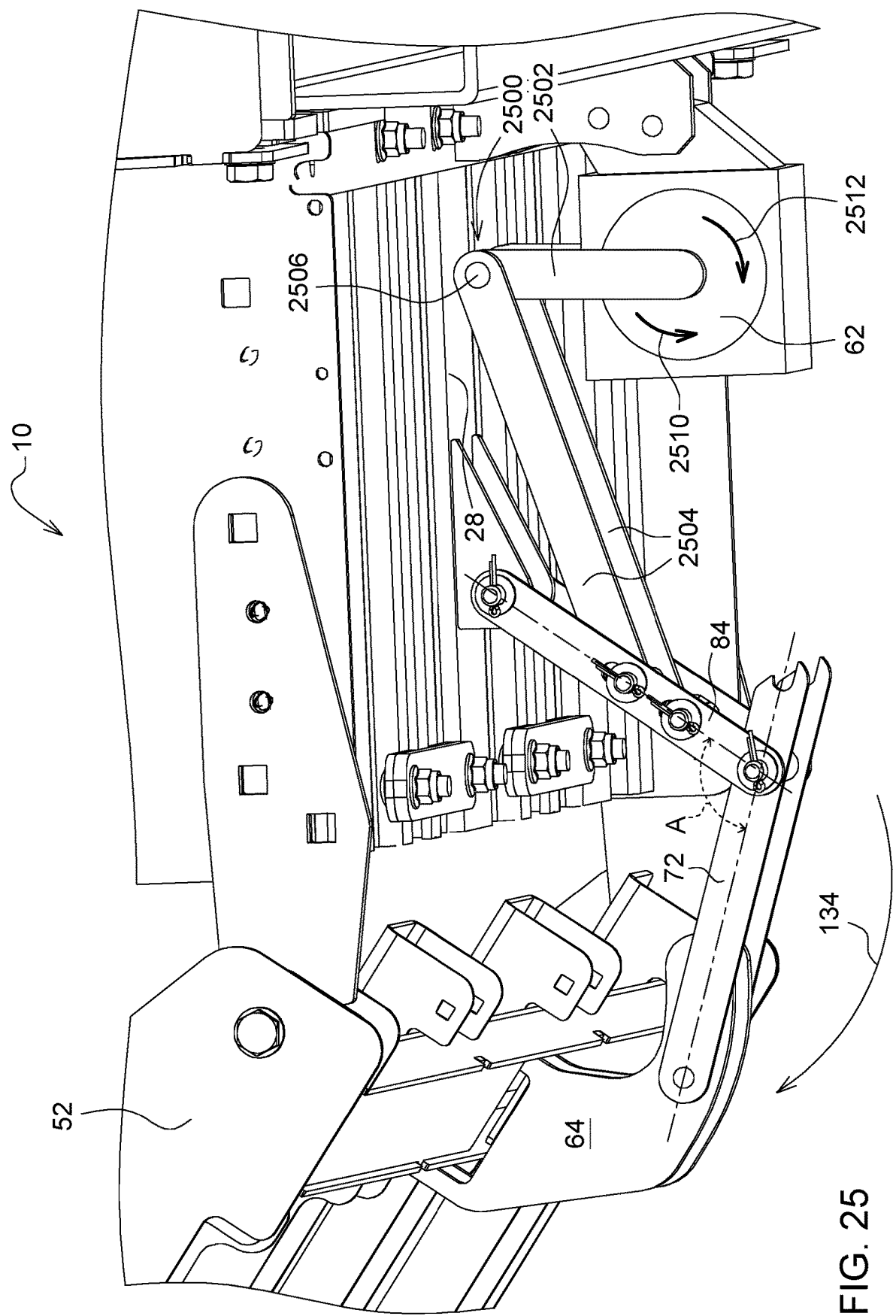
FIG. 25 is a perspective view of another example bale chute actuation arrangement that includes a rotary actuator.

FIG. 25 is another example linkage assembly 62 and actuator 60 operably coupled to move the bale chute 52 between an extended position and a retracted position and vice versa. In this example, the actuator 60 is a rotary actuator that includes a second linkage 2500 that includes a first set of links 2502 and a second set of links 2504 that are pivotably connected to each other at joints 2506. Ends 2508 of the links 2504 are pivotably coupled to the fourth pin 110. Thus, when the rotary actuator 60 rotates the first set of links 2502 in a first direction 2510, the linkage 2500 actuates the linkage 62, which, in turn, causes the bale chute 52 to retract. Rotation of the first setoff links 2502 in a second direction 2512, opposite the first direction 2510, the linkage 2500 actuates the linkage 62, causing the bale chute 52 to extend. The rotary actuator of the example of FIG. 25 may be electrically operated, e.g., the actuator 60 may include an electric motor; hydraulically operated, e.g., the actuator 60 may include a hydraulic rotary motor; or pneumatically operated, e.g., the actuator 60 may include a pneumatic rotary motor.

Figure 26:
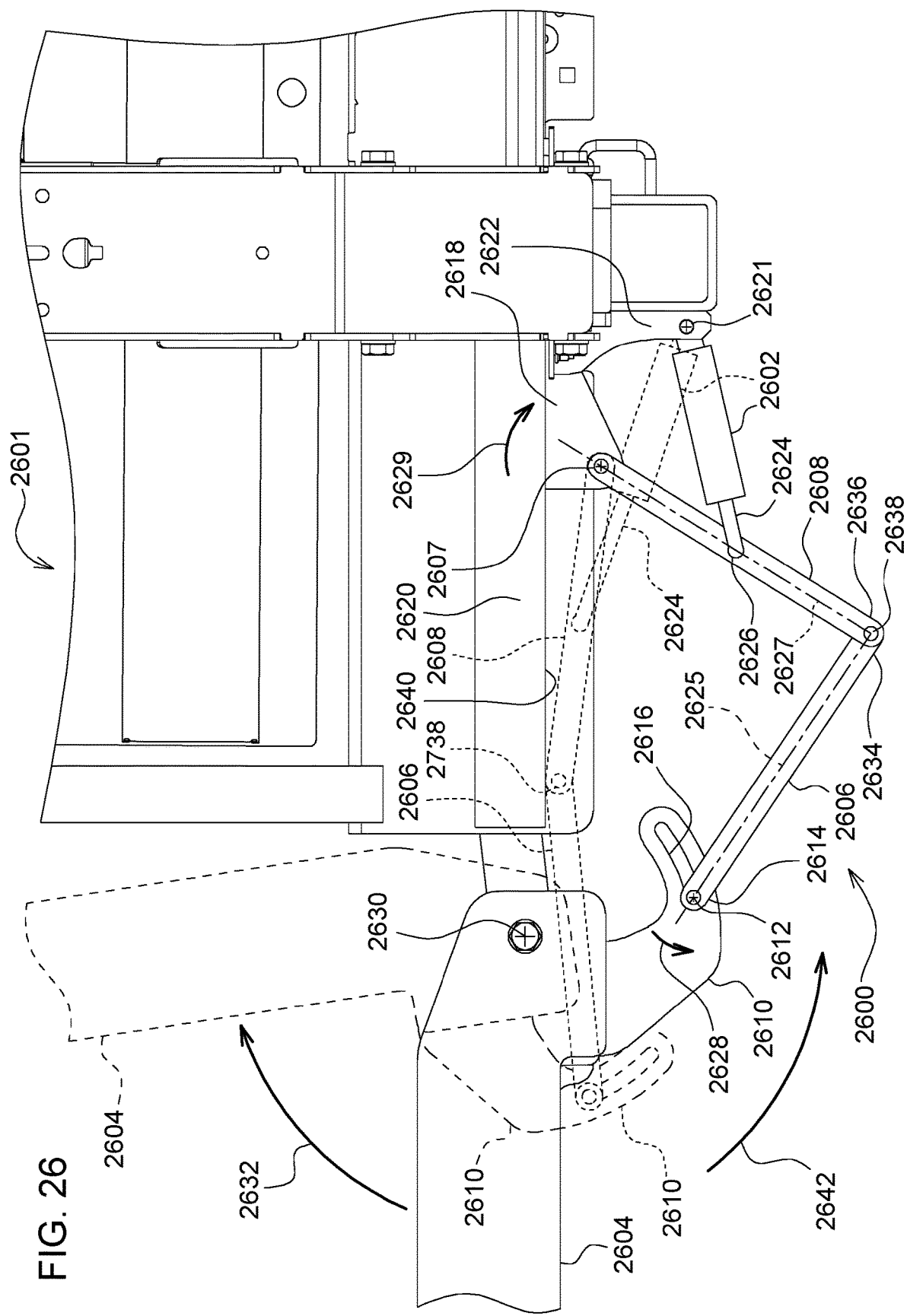
FIG. 26 is a side view of another example bale chute actuation arrangement having a linear actuator and a past center locking capability.

FIG. 26 is a side view of another example linkage assembly 2600, actuator 2602, and bale chute 2604 of a baler 2601 showing the different components in both an extended position and a retracted position. The actuator 2602 is operable to move the bale chute 2604, via the linkage assembly 2600, between the extended position and the retracted position and vice versa. The portions shown in solid lines illustrate the linkage assembly 2600, actuator 2602, and the bale chute 2604 in the extended position, while the portions shown in dotted lines illustrate the linkage assembly 2600, actuator 2602, and the bale chute 2604 in the retracted position.

The linkage assembly 2600 includes a first set of links 2606 pivotably connected to a second set of links 2608. The first set of links 2606 are also pivotably connected to brackets 2610 affixed to or formed on the bale chute 2604. Similar to the example shown in FIG. 8, the pivotable connection between the first set of links 2606 and the brackets 2610 includes a pin 2612 that extends through ends 2614 of the first links and through curved slots 2616 of the brackets 2610. Ends 2607 of the second set of links 2608 are pivotably connected to first brackets 2618 attached to or formed on a baler frame 2620. The actuator 2602 is pivotably connected second brackets 2622 of the baler frame 2620 by a pinned connection 2621 and pivotably connected to the second set of links 2608. The actuator 2602 is a linear actuator and may be any type of linear actuator as described earlier or otherwise within the scope of the present disclosure. A rod 2624 of the actuator 2602 connects to the second set of links 2608 via a pin 2626 that extends through the rod 2624 and the second set of links 2608.

In operation, with the linkage assembly 2600, actuator 2602, and bale chute 2604 in the extended position, as the rod 2624 is extended by the actuator 2602, the first set of links 2606 pivot about the pin 2612 in the direction of arrow 2628, and the second set of links 2608 pivot about the pivotable connection with the first brackets 2618 in the direction of arrow 2629. As a result, a distance between ends 2607 of the second set of links 2608 and ends 2614 of the first set of links 2606 increases, causing the bale chute to pivot about a pivotable connection 2630 between the bale chute 2604 and the baler frame 2620 in the direction of arrow 2632.

As extension of the rod 2624 continues, the first set of links 2606 and the second set of links 2608 align with each other. Alignment of the first set of links 2606 and the second set of links 2608 occurs when a longitudinal centerline 2625 of the first set of links 2606 aligns with a longitudinal centerline 2627 of the second set of links 2608. Alignment of the first and second set of links 2606 and 2608 defines a center position. As the rod 2624 is further extended, the first set of links 2606 and the second set of links 2608 rotate past the center position until ends 2634 and 2636 of the first and second set of links 2606 and 2608, respectively, that are pivotably coupled at a pivotable connection 2638 contact a surface 2640 of the baler frame 2620, as shown in dotted lines. In this position, the bale chute 2604 is in the retracted position. Further, in this "past center" condition, the linkage assembly 2600 is in a self-locking configuration. That is, the weight of the bale chute 2604 operates to maintain the ends 2634 and 2636 of the first and second set of links 2606 and 2608 in contact with the surface 2640. Thus, as the baler 2601 is moved, such as during transportation, the weight of the bale chute 2604 locks the bale chute 2604 in the retracted position and, thereby, preventing movement of the bale chute 2604 from the retracted position to the extended position. Extension of the bale chute 2604 is accomplished by retraction of the rod 2624, causing reversal of the movement of the first and second set of links 2606 and 2608 described above and, consequently, rotation of the bale chute 2604 in the direction of arrow 2642 into the extended position.

Figure 27:
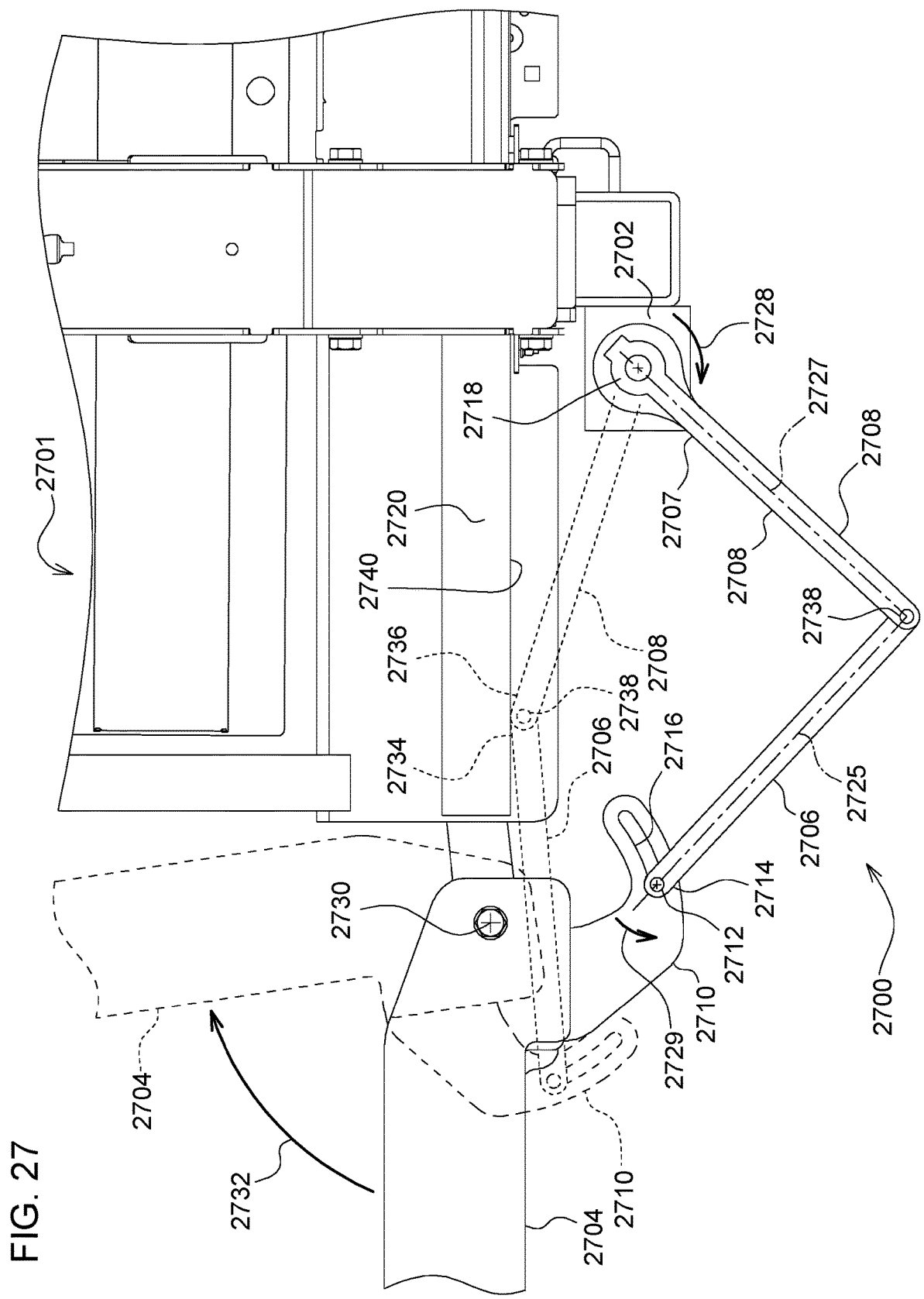
FIG. 27 is a side view of a further example bale chute actuation arrangement having a rotary actuator and a past center locking capability.

FIG. 27 is a side view of another example linkage assembly 2700, actuator 2702, and bale chute 2704 of a baler 2701 showing the different components in both an extended position and a retracted position. In this example, the actuator 2702 is a rotary actuator and is operable to move the bale chute 2704, via the linkage assembly 2700, between the extended position and the retracted position and vice versa. The portions shown in solid lines illustrate the linkage assembly 2700, actuator 2702, and the bale chute 2704 in the extended position, while the portions shown in dotted lines illustrate the linkage assembly 2700, actuator 2702, and the bale chute 2704 in the retracted position.

The linkage assembly 2700 includes a first set of links 2706 pivotably connected to a second set of links 2708. The first set of links 2706 are also pivotably connected to brackets 2710 affixed to or formed on the bale chute 2704. Similar to the example shown in FIGS. 8 and 26, the pivotable connection between the first set of links 2706 and the brackets 2710 includes a pin 2712 that extends through ends 2714 of the first links and through curved slots 2716 of the brackets 2710. Ends 2707 of the second set of links 2708 are fixedly connected to a rotatable portion 2718 of the actuator 2702. The actuator 2702 is a rotary actuator and may be any type of rotary actuator as described earlier or otherwise within the scope of the present disclosure.

In operation, with the linkage assembly 2700, actuator 2702, and bale chute 2704 in the extended position, as the rotatable portion 2718 is rotated in the direction of arrow 2728, the first set of links 2706 pivot about the pin 2712 in the direction of arrow 2729, and the second set of links 2708 pivot with the rotatable portion 2718 of the actuator 2702 in the direction of arrow 2728. As a result, a distance between ends 2707 of the second set of links 2708 and ends 2714 of the first set of links 2606 increases, causing the bale chute to pivot about a pivotable connection 2730 between the bale chute 2704 and the baler frame 2720 in the direction of arrow 2732.

As the rotatable portion 2718 of the actuator 2704 continues to rotate in the direction of arrow 2728, the first set of links 2706 and the second set of links 2708 align with each. Alignment of the first set of links 2706 and the second set of links 2708 occurs when a longitudinal centerline 2725 of the first set of links 2706 aligns with a longitudinal centerline 2727 of the second set of links 2708. Alignment of the first and second set of links 2706 and 2708 defines a center position. As the rotatable portion 2718 continues to rotate in the direction of arrow 2728, the first set of links 2706 and the second set of links 2708 rotate past the center position until ends 2734 and 2736 of the first and second set of links 2706 and 2708, respectively, that are pivotably coupled at a pivotable connection 2738 contact a surface 2740 of the baler frame 2720, as shown in dotted lines. In this position, the bale chute 2704 is in the retracted position. Further, in this "past center" condition, the linkage assembly 2700 is in a self-locking configuration. That is, the weight of the bale chute 2704 operates to maintain the ends 2734 and 2736 of the first and second set of links 2706 and 2708 in contact with the surface 2740. Thus, as the baler 2701 is moved, such as during transportation, the weight of the bale chute 2704 locks the bale chute 2704 in the retracted position and, thereby, preventing movement of the bale chute 2704 from the retracted position to the extended position. Extension of the bale chute 2704 is accomplished by rotation of the rotatable portion 2718 of the actuator 2702 in the opposite direction of arrow 2728, causing reversal of the movement of the first and second set of links 2706 and 2708 described above and, consequently, rotation of the bale chute 2704 in the direction of arrow 2729 into the extended position.

Figure 23:
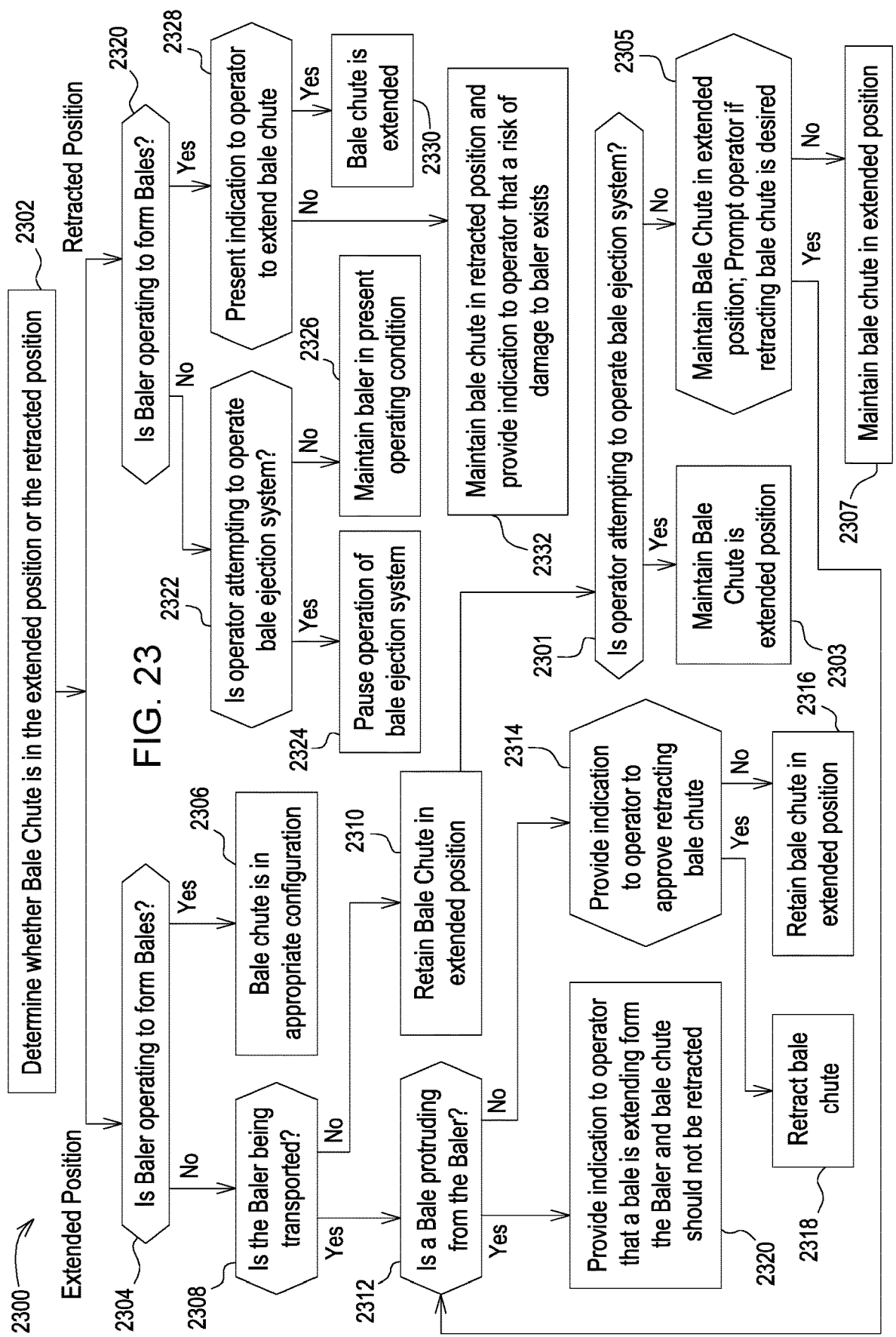
FIG. 23 is an example method of controlling a position of a bale chute of a baler, according to some implementations of the present disclosure.

FIG. 23 is a flowchart for an example method 2300 of determining a condition of a bale chute and determining whether to reposition the bale chute based on the determined condition. As explained above, maintaining a bale chute in an extended position during while the baler is not operating to form bales but, rather, being transported to a different location, may pose safety hazards. In this context, transport of the baler connotes that a baler is being "roaded" or moved from one position to a new location by a vehicle, such as a tractor, in order to conduct baling operations at the new location. Therefore, it is desirable to retract the bale chute into the retracted position during transport of the baler to a different location. At 2302, position of a bale chute of a baler, which may be similar to bale chute 52 of baler 10, is determined. Particularly, at 2302, a determination is made as to whether the bale chute is in a lowered or extended position or a raised or retracted position. In some implementations, one or more positions sensors may be used to detect whether the bale chute is in the extended or retracted position. Numerous types of sensors may be used to detect a position of the bale chute, such as a rotary potentiometer, a linear potentiometer, a camera, an encoder (such as an encoder wheel), or an extensometer. If the bale chute is determined to be in the extended position, which may be similar to extended position 56 described above, at 2304, a determination is made as to whether the baler is operating to form bales. Whether the baler is operating to produce bales may be determined by, for example, whether a power take-off (PTO) is actively sending power to the baler, whether a transmission of the baler is spinning at or above a selected rotational speed, or both. If a PTO is not sending power to the baler, if the transmission is at or below a selected rotational speed, e.g., zero rotations per minute (RPM), or both, then the baler is determined not be operating to produce bales. At 2306, if the bale chute is in the extended position and the baler is operating to form bales, then the bale chute is in the appropriate configuration and the method 2300 stops. If the bale chute is in the extended position and the baler not operating to produce bales, the method moves to 2108 where a determination is made as to whether the baler is being transported, such as along a roadway or along a field. Whether the baler is being transported may be determined, for example, based on a speed at which the baler is traveling or a speed of the vehicle pulling the baler, such as a tractor.

Transportation of the baler may be detected using GPS information. GPS information may include position, map, and speed information. The map information may include roadway information, and using GPS position and map information to detect that the baler is located on a roadway may be used to determine that the baler is being transported.

One or more cameras may also be used, either alone, or in combination with one or more other types of information, such as speed information and GPS information, to determine whether the baler is being transported. For example, video images, such as real-time video images, may be used to detect whether the baler is being transported along a roadway. The video images may be analyzed to detect, for example, an outline of a roadway. Visually identifying a roadway using the captured video images may be used to determine that the baler is being transported. In some implementations, the video images may be combined with other types of information, such as GPS information or speed information, to determine that the baler is being transported.

At 2310, if the baler is determined as not being transported, retracting the bale chute into the retracted position not needed and the bale chute is permitted to remain in the extended position. For example, although the baler may not be operating to produce bales, if the baler is not being transported, a safety risk posed by the extended bale chute, such as to other vehicles or pedestrians using a roadway, is not present. In some implementations, a notification may be transmitted to an operator, such as an operator of the baler or operator of a vehicle transporting the baler. The notification may provide an indication to the operator, such as an alert, that the bale chute is in the extended position. The indication may be in the form of a visual, audible, or tactile. An alert may be displayed on a display located in an operator's compartment of a vehicle transporting the baler. For example, the display may be located in the cabin of a tractor being used to transport the baler. The display may be a flat panel display, tablet, personal communication device, or other type of display device. An audible indication may be provided by a speaker or other sound generating device located in the operator's compartment or with the operator, such as a personal communication device. Other types of devices that may be used to provide an indication to the operator, such as the devices described below.

At 2301, a further determination is made as to whether the operator is attempting to operate the bale ejection system. The bale ejection system operates to eject a formed bale from a baler, such as from the cavity 31 of the baler 10, described above. If it is determined that the operator is attempting to operate the bale ejection system, at 2103, the bale chute is maintained in the extended position. At 2305, if it is determined that the operator is not attempting to operate the bale ejection system, the bale chute is maintained in the extended position and, in some implementations, the operator may be prompted to retract the bale chute. The operator may be prompted to retract the bale chute using an indication presented to the operator. At 2307, if the operator declines to raise the bale chute, the bale chute remains in the extended position. On the other hand, if the operator indicates a desire to raise the bale chute, the method 2300 moves to 2312 where a determination is made as to whether a bale is extending form the baler, which is described in more detail below.

At 2308, if a determination is made that the baler is being transported, the method moves to 2312 where a determination is made as to whether a bale is protruding from the baler, such as extending from the cavity 31. If a bale is extending from the baler and an attempt is made to retract the bale chute, damage may result, such as to the bale chute, an actuator, such as actuator 60, a linkage connecting the bale chute to the actuator, such as linkage 62, or another part of the baler. Numerous types of sensors may be used to determine whether a bale is extending from the baler. For example, a contact sensor, an optical sensor, a displacement sensor, a star wheel sensor, or any other type of sensor may be used to determine whether a bale is presently extending from the baler. At 2314, if a bale is determined not to be extending from the baler, an indication may be provided to the operator, such as a visual, audible, or tactile indication, that the bale chute may be retracted. In some implementations, at 2314, an operator may be prompted as to whether to retract the bale chute or retain the bale chute in the extended position. If the operator chooses not to retract the bale chute, at 2316, the bale chute remains in the extended position. In such instances, an indication may be provided to the operator that the bale is in the extended position while the baler is being transported and that a safety risk may be present. A notification may also be provided to the operator that the bale chute remains in the extended position. Further, in some implementations, if the baler is determined to be in the extended position while the baler is being transported and no bale is extended from the baler, the bale chute may be retracted automatically, and a notification may be presented the operated that the bale chute is being retraced. If the operator chooses to retract the bale chute, at 2318, the bale chute is retracted. On the other hand, at 2312, if a bale is determined to be extending from the baler, an indication may be provided to the operator that the bale chute should not be retracted. The indication may further indicate that a bale is presently extending from the baler. In some implementations, if the baler is detected as being transported and a bale is determined to be extending from the baler, the bale chute may be prevented from being retracted. That is, in some instances, an input by the operator to raise the bale chute when a bale is extending from the bale chute may be overridden and the bale chute prevented from being retracted.

Returning to 2302, if the bale chute is detected as being retracted, the method 2100 moves to 2320 where, similar to 2314, a determination is made the baler is operating to produce bales. If the determination is made that the baler is not producing bales, the method moves to 2322 where it is determined whether the operator is attempting to operate a bale ejection system of the baler. At 2324, if a determination is made that the operator is attempting to operate the bale ejection system, operation of a bale ejection system is temporarily prevented or paused. While the operation of the bale ejection system is paused, the bale chute may be extended, and, upon extension of the bale chute, the operation of the bale ejection system may be resumed. In some implementations, prior to extending the bale chute, an operator may be prompted to approve extension of the bale chute, at which time extension of the bale chute is performed. In some implementations, an indication that operation of the bale ejection system is being paused due to the bale chute being in the retracted position may be presented to the operator. During ejection of bales from the baler, ejected bales are positioned onto the extended bale chute. With the bale chute in the retracted position, an attempted ejection of a bale may result in damage to the bale chute or another part of the baler. In some implementations, operation of the baler to produce bales may be prevented automatically when the bale chute is determined to be in the retracted position. At 2126, if a determination is made that the operator is not attempting to operate the bale ejection system, then the baler is maintained in the baler's present condition and method 2300 ends.

Returning to 2320, if the determination is made that the baler is producing bales, extension of the bale chute is needed, and, in some implementations, an indication may be presented to the operator that the bale chute should be extended due to operation of the baler to produce bales at 2328. If the operator acknowledges the indication with authorization to extend the bale chute, at 2330, the bale chute is extended in response to the operator's input. In some implementations, the bale chute may automatically be extended upon detection that the bale chute is in the retracted position and that baler is operating to produce bales. In such instances, a notification may be provided to the operator that extension of the bale chute may be prevented. If the operator chooses to prevent extension of the bale chute, bale production may automatically be halted. At 2332, if the operator fails to lower the bale chute in response to the notification that the bale chute is in the retracted position while the baler is operating to produce bales, a notification that the baler is at risk for damage may be presented to the operator.

In some implementations, one or more aspects of the method 2300 may be automated or autonomously performed. For example, a computer system, which may be similar to the computer systems described in more detail below, may be used to monitor a status of the baler and, in some implementations, the vehicle being used to transport the baler and control one or more aspects of the baler and, in some instances, the transport vehicle. For example, the computer system may actively monitor a position of the bale chute and other operational aspects of the baler. The computer system may detect whether the bale chute is in the extended position, whether the baler is being operated to produce bales, whether the baler is being transported, and whether a bale is extending from the baler. If the computer system detects that the bale chute is extended and the baler is being used to produce bales, the computer system may be operable to maintain the bale chute in an extended position. If the computer system detects that the bale chute is extended, the baler is not producing bales, and that the baler is being transported, the computer system may automatically retract the bale chute. In some implementations, the computer system may provide a prompt to the operator requesting authorization to retract the bale chute. On the other hand, if the bale chute is extended, the baler is not operating to produce bales, and the baler is not being transported, the computer system may operate to maintain the bale chute in the extended position. If the computer system detects that the bale chute is extended, the baler is not operating to produce bales, the baler is being transported, and a bale extending from the baler, the bale chute may be prevented from being retracted. In such instances, an indication may be provided to an operator that a safety risk may exist due to transportation of the baler with the bale chute extended and a bale presently extended from the baler. Further, in such instances, the vehicle being operated to transport the baler may be prevented from moving to transport the baler. Also, if a bale is not detected as extending from the baler and the baler is being transported, the bale chute may be automatically retracted. In such instances, an indication that the bale chute is or has been retracted may be presented to the operator.

Figure 24:
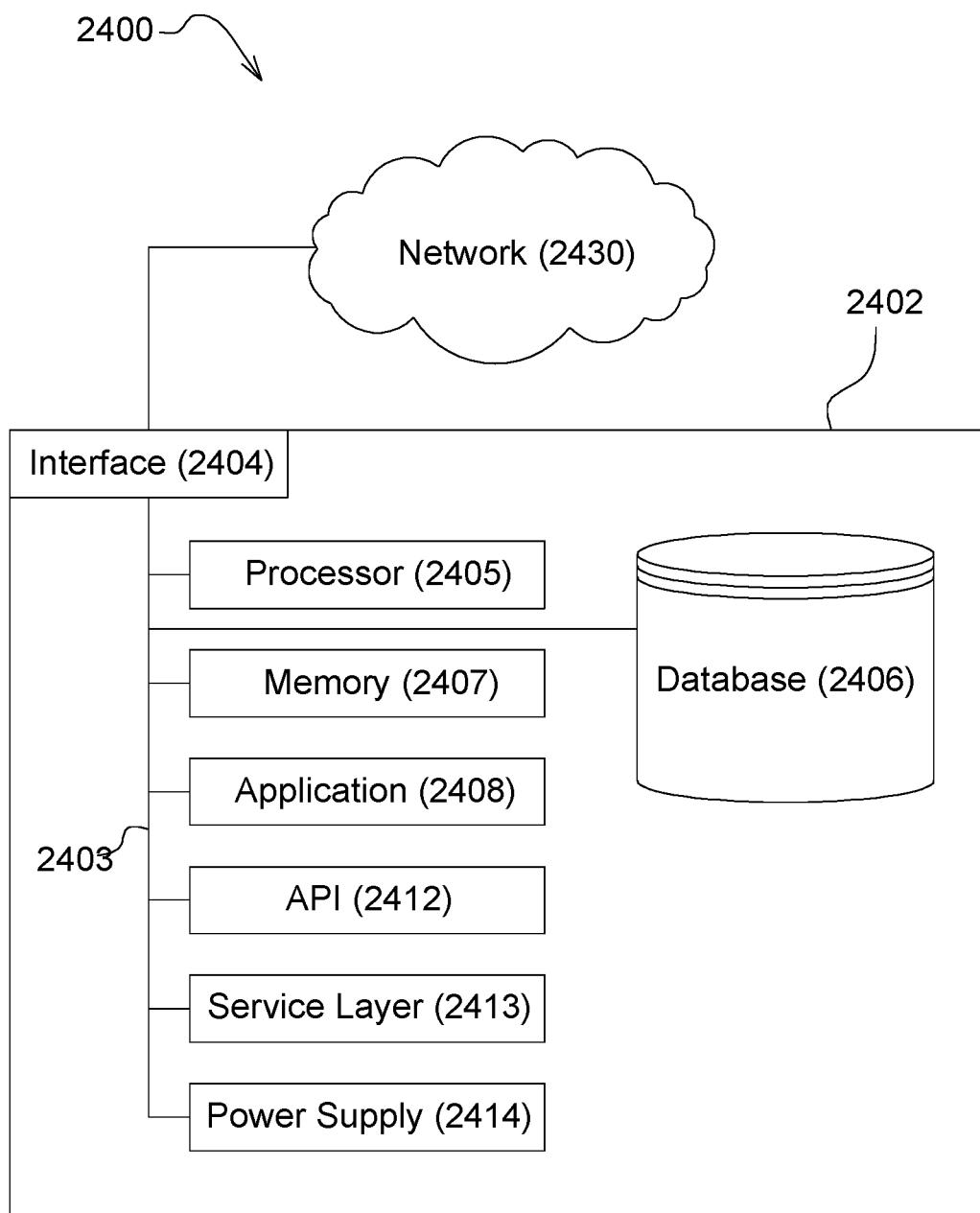
FIG. 24 is a block diagram illustrating an example computer system used to provide computational functionalities associated with described algorithms, methods, functions, processes, flows, and procedures as described in the present disclosure, according to some implementations of the present disclosure.

FIG. 24 is a block diagram of an example computer system 2400 used to provide computational functionalities associated with described algorithms, methods, functions, processes, flows, and procedures described in the present disclosure, according to some implementations of the present disclosure. The illustrated computer 2402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 2402 can include input devices such as keypads, keyboards, and touch screens that can accept user information. Also, the computer 2402 can include output devices that can convey information associated with the operation of the computer 2402. The information can include digital data, visual data, audio information, or a combination of information. The information can be presented in a graphical user interface (UI) (or GUI).

The computer 2402 can serve in a role as a client, a network component, a server, a database, a persistency, or components of a computer system for performing the subject matter described in the present disclosure. The illustrated computer 2402 is communicably coupled with a network 2430. In some implementations, one or more components of the computer 2402 can be configured to operate within different environments, including cloud-computing-based environments, local environments, global environments, and combinations of environments.

At a high level, the computer 2402 is an electronic computing device operable to receive, transmit, process, store, and manage data and information associated with the described subject matter. According to some implementations, the computer 2402 can also include, or be communicably coupled with, an application server, an email server, a web server, a caching server, a streaming data server, or a combination of servers.

The computer 2402 can receive requests over network 2430 from a client application (for example, executing on another computer 2402). The computer 2402 can respond to the received requests by processing the received requests using software applications. Requests can also be sent to the computer 2402 from internal users (for example, from a command console), external (or third) parties, automated applications, entities, individuals, systems, and computers.

Each of the components of the computer 2402 can communicate using a system bus 2403. In some implementations, any or all of the components of the computer 2402, including hardware or software components, can interface with each other or the interface 2404 (or a combination of both), over the system bus 2403. Interfaces can use an application programming interface (API) 2412, a service layer 2413, or a combination of the API 2412 and service layer 2413. The API 2412 can include specifications for routines, data structures, and object classes. The API 2412 can be either computer-language independent or dependent. The API 2412 can refer to a complete interface, a single function, or a set of APIs.

The service layer 2413 can provide software services to the computer 2402 and other components (whether illustrated or not) that are communicably coupled to the computer 2402. The functionality of the computer 2402 can be accessible for all service consumers using this service layer. Software services, such as those provided by the service layer 2413, can provide reusable, defined functionalities through a defined interface. For example, the interface can be software written in JAVA, C++, or a language providing data in extensible markup language (XML) format. While illustrated as an integrated component of the computer 2402, in alternative implementations, the API 2412 or the service layer 2413 can be stand-alone components in relation to other components of the computer 2402 and other components communicably coupled to the computer 2402. Moreover, any or all parts of the API 2412 or the service layer 2413 can be implemented as child or sub-modules of another software module, enterprise application, or hardware module without departing from the scope of the present disclosure.

The computer 2402 includes an interface 2404. Although illustrated as a single interface 2404 in FIG. 24, two or more interfaces 2404 can be used according to particular needs, desires, or particular implementations of the computer 2402 and the described functionality. The interface 2404 can be used by the computer 2402 for communicating with other systems that are connected to the network 2430 (whether illustrated or not) in a distributed environment. Generally, the interface 2404 can include, or be implemented using, logic encoded in software or hardware (or a combination of software and hardware) operable to communicate with the network 2430. More specifically, the interface 2404 can include software supporting one or more communication protocols associated with communications. As such, the network 2430 or the interface's hardware can be operable to communicate physical signals within and outside of the illustrated computer 2402.

The computer 2402 includes a processor 2405. Although illustrated as a single processor 2405 in FIG. 24, two or more processors 2405 can be used according to particular needs, desires, or particular implementations of the computer 2402 and the described functionality. Generally, the processor 2405 can execute instructions and can manipulate data to perform the operations of the computer 2402, including operations using algorithms, methods, functions, processes, flows, and procedures as described in the present disclosure.

The computer 2402 also includes a database 2406 that can hold data for the computer 2402 and other components connected to the network 2430 (whether illustrated or not). For example, database 2406 can be an in-memory, conventional, or a database storing data consistent with the present disclosure. In some implementations, database 2406 can be a combination of two or more different database types (for example, hybrid in-memory and conventional databases) according to particular needs, desires, or particular implementations of the computer 2402 and the described functionality. Although illustrated as a single database 2406 in FIG. 24, two or more databases (of the same, different, or combination of types) can be used according to particular needs, desires, or particular implementations of the computer 2402 and the described functionality. While database 2406 is illustrated as an internal component of the computer 2402, in alternative implementations, database 2406 can be external to the computer 2402.

The computer 2402 also includes a memory 2407 that can hold data for the computer 2402 or a combination of components connected to the network 2430 (whether illustrated or not). Memory 2407 can store any data consistent with the present disclosure. In some implementations, memory 2407 can be a combination of two or more different types of memory (for example, a combination of semiconductor and magnetic storage) according to particular needs, desires, or particular implementations of the computer 2402 and the described functionality. Although illustrated as a single memory 2407 in FIG. 24, two or more memories 2407 (of the same, different, or combination of types) can be used according to particular needs, desires, or particular implementations of the computer 2402 and the described functionality. While memory 2407 is illustrated as an internal component of the computer 2402, in alternative implementations, memory 2407 can be external to the computer 2402.

The application 2408 can be an algorithmic software engine providing functionality according to particular needs, desires, or particular implementations of the computer 2402 and the described functionality. For example, application 2408 can serve as one or more components, modules, or applications. Further, although illustrated as a single application 2408, the application 2408 can be implemented as multiple applications 2408 on the computer 2402. In addition, although illustrated as internal to the computer 2402, in alternative implementations, the application 2408 can be external to the computer 2402.

The computer 2402 can also include a power supply 2414. The power supply 2414 can include a rechargeable or non-rechargeable battery that can be configured to be either user- or non-user-replaceable. In some implementations, the power supply 2414 can include power-conversion and management circuits, including recharging, standby, and power management functionalities. In some implementations, the power-supply 2414 can include a power plug to allow the computer 2402 to be plugged into a wall socket or a power source to, for example, power the computer 2402 or recharge a rechargeable battery.

There can be any number of computers 2402 associated with, or external to, a computer system containing computer 2402, with each computer 2402 communicating over network 2430. Further, the terms "client," "user," and other appropriate terminology can be used interchangeably, as appropriate, without departing from the scope of the present disclosure. Moreover, the present disclosure contemplates that many users can use one computer 2402 and one user can use multiple computers 2402.

Described implementations of the subject matter can include one or more features, alone or in combination.

For example, in a first implementation, a computer-implemented method for controlling at least one of an extension and a retraction of a bale chute of a baler includes: determining whether a bale chute is in an extended position or a retracted position; determining whether the baler is operating to produce bales; if the baler is determined to be in the extended position and if the baler is determined to be operating to produce bales, maintaining the bale chute in the extended position; if the baler is determined to be in the extended position and if the baler is determined not to be producing bales, determining if the baler is being transported; if the baler is determined not to be being transported, maintaining the bale chute in the extended position; if the baler is determined to be being transported, determining whether a bale is protruding from baler; if a bale is determined to be protruding from the baler, preventing retraction of the bale chute; and if a bale is determined not to be protruding from the baler, retracting the bale chute into the retracted position.

The foregoing and other described implementations can each, optionally, include one or more of the following features:

A first feature, combinable with any of the following features, wherein retracting the bale chute into the retracted position if a bale is determined not to be protruding includes providing an indication to an operator to verify retraction of the bale chute prior to retracting the bale chute to the retracted position.

A second feature, combinable with any of the previous or following features, the method further including: detecting whether a bale ejection system is being operated when the baler is determined not to be being transported and the bale chute is determined to be in the extended position; and maintaining the bale chute in the extended position if the bale ejection system is being operated.

A third feature, combinable with any of the previous or following features, the method further including: determining if a bale is protruding from the baler if the bale ejection system is not being operated; and retracting the bale chute if a bale is determined not to be protruding from the baler.

A fourth feature, combinable with any of the previous or following features, the method further including extending the bale chute into the extended position if the bale chute is determined to be in the retracted position and if the baler is determined to be operating to produce bales.

A fifth feature, combinable with any of the previous or following features, the method further including: determining if a bale ejection system is operating if the bale chute is determined to be in the retracted position and if the baler is determined not to be operating to produce bales; and preventing operation of the bale ejection system if the bale ejection system is determined to be operating.

A sixth feature, combinable with any of the previous or following features, wherein determining if the baler is being transported includes utilizing GPS information to determine whether the baler is being transported.

A seventh feature, combinable with any of the previous or following features, wherein utilizing GPS information to determine whether the baler is being transported includes utilizing GPS position information and map information containing roadway information and determining whether a GPS position of the baler is located along a roadway to verify the baler is being transported.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/nonvolatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

The present disclosure provides methods and systems for selectively treating a worksite, such as a field or portion of a field, based on collected soil parameter data having granular spatial resolution, such as in the millimeter or centimeter range. The methods and systems reduce time and expense associated with treating an entirety of the worksite that would otherwise be used. Without in any way limiting the scope, interpretation, or application of the claims appearing below, a technical effect of one or more of the example embodiments disclosed herein is conservation of resources, including temporal resources, pecuniary resources, and equipment life resources.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A baler operable to form bales, the baler comprising:
   a housing comprising:
      a first end;
      a second end; and
      a baling chamber;
   a bale chute pivotably connected to housing at the second end;
   an actuator that extends and retracts the bale chute into an extended position and a retracted position, respectively;
   a lock assembly coupled to the actuator and movable into a locked configuration to lock the bale chute into the retracted position in response to movement of the actuator in a first direction; and
   a linkage assembly,
   wherein the bale chute is operably coupled to the actuator by the linkage assembly,
   wherein the linkage assembly comprises:
      a first set of links pivotably coupled to the bale chute, the first set of links comprising first link ends; and
      a second set of links pivotably coupled to the first set of links and pivotably coupled to the housing, the second set of links comprising:
         a first set of aligned elongated slots; and
         a second set of aligned elongated slots offset from the first set of aligned elongated slots, and
   wherein the lock assembly comprises:
      receptacles formed in the first link ends;
      a first pin received into the second set of elongated slots and slideable therein; and
      a second pin received into the first set of elongated slots and slideable therein and configured to be removably received into the receptacles, the first pin and the second pin coupled to and biased away from each other by a biasing component such that movement of one of the first pin and the second pin towards the other of the first pin and the second pin increases a biasing force that operates to repel the first pin from the second pin.

2. The baler of claim 1, wherein the actuator comprises a moveable rod, wherein the moveable rod is pivotably coupled to the second pin, wherein extension of the moveable rod in the first direction causes the first set of links to rotate relative to the second set of links such that the first link ends engage the second pin, displacing the second pin towards the first pin until the receptacles align with the second pin at which point the biasing force urges the second pin into engagement with the receptables and locking the bale chute into the retracted position.

3. The baler of claim 2, wherein rotation of the first set of links relative to the second set of links comprises increasing an angle formed the first set of links and the second set of links.

4. The baler of claim 2, wherein retraction of the moveable rod in a second direction, opposite the first direction, withdraws the second pin from the receptacles and decreases an angle formed between the first set of links and the second set of links to move the bale chute into the extended position.

5. The baler of claim 1, further comprising a third pin, wherein the bale chute comprises brackets forming a third set of elongated slots, wherein the third pin is received into the third set of elongated slots and couples the second ends of the first set of links to the brackets of the bale chute.

6. The baler of claim 5, wherein the third set of elongated slots are U-shaped.

7. The baler of claim 5, wherein the third pin is movable within the third elongated slots and relative to the brackets in response to pivoting movement of the bale chute towards the second end of the housing.

8. The baler of claim 1, further comprising a first rod and a second rod extending between the first pin and the second pin, wherein the biasing component comprises a first spring and a second spring, wherein the first spring is received onto the first rod, wherein the second spring is received onto the second rod, wherein the first spring and the second spring are located between the first pin and the second pin, and wherein the first rod and the second rod capture the first pin and the second pin and define a maximum distance permitted to be formed between the first pin and the second pin.

9. The baler of claim 8, wherein the first spring and the second spring are compressible to alter a distance between the first rod and the second rod.

10. A baler operable to form bales, the baler comprising:
    a housing comprising:
       a first end;
       a second end; and
       a baling chamber;
    a bale chute pivotably connected to housing at the second end;
    an actuator that extends and retracts the bale chute into an extended position and a retracted position, respectively; and
    a lock assembly coupled to the actuator and movable into a locked configuration to lock the bale chute into the retracted position in response to movement of the actuator in a first direction,
    wherein the lock assembly comprises a linkage assembly comprising:
       a first link; and
       a second link pivotably coupled to the first link,
    wherein the linkage assembly is in the locked configuration when the first link and the second link are in a past center condition,
    wherein the past center condition comprises at least one of a first end of the first link and a first end of the second link to be in contact with a frame of the baler,
    wherein the first end of the first link and the first end of the second link are pivotably coupled to each other,
    wherein the actuator is a rotary actuator,
    wherein a second end of the first link is pivotably coupled to the bale chute, and wherein a second end of the second link is fixedly coupled to a rotary portion of the rotary actuator.

11. A baler operable to form bales, the baler comprising:
a housing comprising:
  a first end;
  a second end; and
  a baling chamber;
a bale chute pivotably connected to housing at the second end;
an actuator that extends and retracts the bale chute into an extended position and a retracted position, respectively; and
a lock assembly coupled to the actuator and movable into a locked configuration to lock the bale chute into the retracted position in response to movement of the actuator in a first direction,
wherein the actuator comprises a rotary actuator that is rotatable in a first direction and a second direction to retract and extend the bale chute, respectively.

* * * * *